(12) United States Patent
Kissa et al.

(10) Patent No.: US 7,844,149 B2
(45) Date of Patent: Nov. 30, 2010

(54) HUMIDITY TOLERANT ELECTRO-OPTIC DEVICE

(75) Inventors: Karl Kissa, West Simsbury, CT (US); William J. Minford, Windsor, CT (US); Glen Drake, Windsor, CT (US)

(73) Assignee: JDS Uniphase Corporation, Milpitas, CA (US)

( * ) Notice: Subject to any disclaimer, the term of this patent is extended or adjusted under 35 U.S.C. 154(b) by 388 days.

(21) Appl. No.: 11/971,683

(22) Filed: Jan. 9, 2008

(65) Prior Publication Data

US 2008/0170821 A1     Jul. 17, 2008

Related U.S. Application Data

(60) Provisional application No. 60/884,653, filed on Jan. 12, 2007.

(51) Int. Cl.
    *G02B 6/42*     (2006.01)
(52) U.S. Cl. .................. 385/40; 385/1; 385/2; 385/3; 385/4; 385/15
(58) Field of Classification Search .............. 385/1, 385/2, 3, 4, 15, 39, 40
See application file for complete search history.

(56) References Cited

U.S. PATENT DOCUMENTS

| | | | |
|---|---|---|---|
| 5,214,724 A | 5/1993 | Seino et al. ................... 385/2 |
| 5,339,369 A | 8/1994 | Hopfer et al. .................. 385/2 |
| 5,359,449 A | 10/1994 | Nishimoto et al. ........... 359/181 |
| 5,388,170 A | 2/1995 | Heismann et al. ............... 385/4 |
| 5,404,412 A | 4/1995 | Seino et al. ..................... 385/2 |
| 5,455,876 A | 10/1995 | Hopfer et al. .................. 385/2 |
| 5,680,497 A | 10/1997 | Seino et al. ................. 385/129 |
| 5,895,742 A | 4/1999 | Lin ............................. 430/321 |
| 6,067,186 A * | 5/2000 | Dalton et al. ............... 359/321 |
| 6,195,191 B1 | 2/2001 | Osenbach et al. ........... 359/238 |
| 6,198,855 B1 | 3/2001 | Hallemeier et al. ............ 385/2 |

(Continued)

FOREIGN PATENT DOCUMENTS

EP     0 813 093     12/1997

(Continued)

OTHER PUBLICATIONS

Oh et al, "Recent Advances in Electrooptic Polymer Modulators Incorporating Highly Nonlinear Chromophore", IEEE J. Quantum Electron., vol. 7, No. 5, pp. 826, 2001.

(Continued)

*Primary Examiner*—Jennifer Doan
(74) *Attorney, Agent, or Firm*—Matthew A. Pequignot; Pequignot + Myers LLC

(57) ABSTRACT

The invention relates to an electro-optic modulator structure containing an additional set of bias electrodes buried within the device for applying bias to set the operating point. Thus the RF electrodes used to modulate incoming optical signals can be operated with zero DC bias, reducing electrode corrosion by galvanic and other effects that can be present in non-hermetic packages. The bias electrodes are at least partially separated from the substrate with a buffer layer, which in one embodiment has a small amount of conductivity. This conductive buffer layer reduces optical loss from the bias electrodes and also reduces DC drift.

27 Claims, 23 Drawing Sheets

U.S. PATENT DOCUMENTS

| | | |
|---|---|---|
| 6,282,356 B1 | 8/2001 | Johnston, Jr. et al. ........ 385/129 |
| 6,310,700 B1 | 10/2001 | Betts ............................. 359/2 |
| 6,411,747 B2 | 6/2002 | Rangary ......................... 385/2 |
| 6,449,080 B1 | 9/2002 | McBrien et al. .............. 359/245 |
| 6,558,585 B1 | 5/2003 | Zhang et al. ................ 264/1.27 |
| 6,560,377 B2 | 5/2003 | Jones et al. ..................... 385/2 |
| 6,583,917 B2 | 6/2003 | Melloni et al. ............... 359/245 |
| 6,646,776 B1 | 11/2003 | Cheung et al. ............... 359/254 |
| 6,674,565 B2 | 1/2004 | Kondo et al. ................ 359/322 |
| 6,714,706 B2 * | 3/2004 | Kambe ......................... 385/41 |
| 6,741,762 B2 | 5/2004 | Grinberg et al. ............... 385/20 |
| 6,819,851 B2 | 11/2004 | Aoki et al. .................. 385/129 |
| 6,853,757 B2 | 2/2005 | Seino et al. ..................... 385/2 |
| 6,867,134 B2 | 3/2005 | Chen et al. ................... 438/686 |
| 6,950,579 B2 | 9/2005 | Ahn et al. ...................... 385/40 |
| 6,978,056 B2 | 12/2005 | Tavlykaev ....................... 385/2 |
| 7,127,128 B2 | 10/2006 | Belmonte et al. ............... 385/2 |
| 7,231,102 B2 | 6/2007 | Ridgway ........................ 385/9 |
| 7,315,662 B2 | 1/2008 | Hunt et al. ...................... 385/2 |
| 2003/0062551 A1 | 4/2003 | Chen ............................ 257/211 |
| 2003/0091257 A1 | 5/2003 | Chakrabarti et al. ............. 385/2 |
| 2003/0133638 A1 | 7/2003 | Jin et al. ......................... 385/2 |
| 2006/0023288 A1 | 2/2006 | McBrien et al. .............. 359/245 |
| 2007/0116475 A1 | 5/2007 | McBrien et al. .............. 398/164 |
| 2007/0146859 A1 | 6/2007 | Yang et al. ................... 359/237 |
| 2007/0147725 A1 | 6/2007 | Crespi et al. .................... 385/9 |
| 2008/0069491 A1 | 3/2008 | Kissa et al. ..................... 385/2 |

FOREIGN PATENT DOCUMENTS

JP    1789177    9/1993

OTHER PUBLICATIONS

Hopfer, et. al., "A novel wideband, lithium niobate electrooptic modulator," Journal of Lightwave Technology, vol. 16, No. 1, Jan. 1998, pp. 73-77.

* cited by examiner

HUMIDITY TOLERANT ELECTRO-OPTIC DEVICE

CROSS-REFERENCE TO RELATED APPLICATIONS

This application claims priority from U.S. Provisional Patent Application Ser. No. 60/884,653 filed Jan. 12, 2007, which is hereby incorporated by reference for all purposes.

TECHNICAL FIELD

The present invention relates generally to electro-optic devices and, more specifically, to electro-optic devices used in fiber-optic telecommunications.

BACKGROUND OF THE INVENTION

Electro-optic devices are frequently used in fiber-optic telecommunication systems to manipulate optical signals. In general, these electro-optic devices include at least one optical waveguide formed from and/or in an electro-optic material. When an electric field is generated in the electro-optic material, the refractive index of the optical waveguide(s) change and the optical signal propagating there through can be altered. Some examples of common electro-optic devices used in telecommunication systems include optical modulators, optical switches, optical couplers, etc.

One example of a particularly successful electro-optic device is the Mach-Zehnder (MZ) optical modulator. Referring to FIG. 1a, there is shown an embodiment of a Mach-Zehnder optical modulator having an optical waveguide 20 formed in an electro-optic substrate 10. The optical waveguide 20 includes a first Y-branch 22, a first interferometer arm 24, a second interferometer arm 26, and a second Y-branch 28. An electrode structure (not shown in FIG. 1a) is provided near/adjacent the optical waveguide 20 for generating an electric field in one or both interferometer arms 24/26. For example according to one well known configuration, the electrode structure includes a signal electrode (also often referred to as a hot electrode) and two ground electrodes, which are configured to generate oppositely oriented electric fields in the first 24 and second 26 interferometer arms. Conventionally, the electrode structure is formed from a highly conductive metal such as gold (Au). The exact position and design of the electrodes relative to the optical waveguide 20 is generally dependent on the substrate. For example, if the substrate is formed from X-cut lithium niobate ($LiNbO_3$), the signal electrode 40 is typically positioned on top of the substrate substantially between the interferometer arms 24/26, while the ground electrodes 42/44 are positioned on top of the substrate outside of the interferometer arms 24/26 (e.g., as illustrated in FIG. 1b). In contrast, if the substrate is formed from Z-cut $LiNbO_3$, the signal electrode 40 is typically positioned substantially above one interferometer arm 26, while the ground electrode 42 is positioned substantially above the other interferometer arm 24 (e.g., as illustrated in FIG. 1c). In each case, the ground electrodes 42, 44 are typically connected to ground, while the signal electrode 40 is connected to a high-frequency power source.

Referring to FIG. 1d there is shown an embodiment of a Z-cut $LiNbO_3$ modulator 100, wherein the signal electrode 140 is connected to a high-frequency power source 145 at one end and to a terminal resistor at the other end, such that it functions as a traveling-wave electrode. In operation, an optical signal is input into the left side of the device 100 where it is transmitted through the optical waveguide 120 until it is split at the first Y-branch 122, and then propagates equally along the two isolated paths corresponding to the two interferometer arms 124/126. Simultaneously, an RF data signal from the high-frequency power source 145 is transmitted through an RF transmission line 147 (e.g., a co-axial cable) to the signal electrode 140, which functions as a microwave transmission line. As the modulation voltage is applied between the signal electrode 140 and the ground electrodes 142 and 144, an electric field is generated in the underlying electro-optic substrate 110. As illustrated in FIG. 1e, the vertical electric field lines in the first 124 and second 126 interferometer arms are oppositely oriented such the light propagating in each of the arms is complementarily phase shifted relative to one another in a push-pull fashion. In accordance with the electro-optic effect, the electric field changes the refractive index within the interferometer arms such that the input optical signal experiences constructive or destructive interference at the second Y-branch 128. This interference produces an amplitude modulated optical signal that is output the right side of the device, wherein the modulation corresponds to the original RF data signal.

Notably, since the Z-axis of a $LiNbO_3$ crystal has the highest electro-optic coefficient, Z-cut $LiNbO_3$ modulators exhibit a relatively high modulation efficiency. Unfortunately, Z-cut $LiNbO_3$ modulators are also known to suffer more from charge build up problems, which for example, may lead to temperature induced bias drift and/or DC drift.

Temperature induced bias drift refers to when the operating (bias) point of the modulator shifts with changes in temperature. In $LiNbO_3$, temperature induced bias drift typically arises from the pyroelectric effect, which creates mobile charge when temperature fluctuations occur in the substrate. The mobile charge can generate strong electric fields that can change the operating (bias) point of the electro-optic modulator. In addition, since the electric fields induced by the pyroelectric effect in Z-cut $LiNbO_3$ are predominantly normal to the substrate, the mobile charge moves toward the surface of the substrate, where the electrodes 140, 142, 144 are located. Accordingly, a bleed layer 160 is typically required near the surface of Z-cut $LiNbO_3$ to dissipate accumulated electric charge. Optionally, additional bleed layers (not shown) are used to dissipate charge at the sides or bottom of the substrate. In general, the bleed layer 160 will be formed from a semiconductive material so that the highly conductive electrodes 140/142/144 are prevented from shorting out.

DC drift refers to when the operating (bias) point of the modulator shifts as a low frequency or DC voltage is applied to the modulator for extended periods of time. In general, low frequency or DC voltages are required to control the operating (bias) point of the modulator (i.e., the point about which the swing of the modulated RF signal is accomplished). For example in the embodiment described with reference to FIG. 1d, the RF data signal corresponds to a modulation signal that includes an RF component superimposed on a DC or low frequency component.

DC drift, also termed bias drift, is particularly problematic when the modulator includes a buffer layer 150 disposed between the substrate 110 and the signal electrode 140. If the buffer layer 150 has little conductivity relative to the substrate 110, mobile charge within the substrate, which may be in the form of electrons, holes, or ions, counteracts the effect of the applied voltage, establishing a positive DC drift. In addition, impurities in the buffer layer 150, which is typically formed from a dielectric material such as silicon dioxide ($SiO_2$), are believed to form additional mobile charge, which either counteract the effect of the applied voltage, establishing a positive DC drift, or enhance the applied bias voltage, establishing a negative DC drift. The former is more common for undoped $SiO_2$. The end result of the mobile charge in the buffer and substrate is that the bias voltage required to operate the electro-optic modulator increases over time.

The purpose of the buffer layer 150 is two-fold. First, the buffer layer 150 is used to prevent optical absorption of the optical signal by the overlying electrodes 140/142. Notably, this is more important for Z-cut embodiments, wherein the electrodes 140/142 lie directly over the interferometer arms 126/124. Secondly, the buffer layer 150 is used to speed up the propagation of the RF modulation signal so that the optical wave and the microwave propagate with equal phase velocities, thus increasing the interaction length, and as a result, increasing modulation bandwidth and/or efficiency at high frequencies.

Various solutions to prevent dc drift have been proposed. For example, in X-cut $LiNbO_3$ modulators it has been proposed to provide a separate low-frequency bias electrode structure 270, optically in series with an RF electrode structure 240, as illustrated in FIG. 2. A buffer layer 250 is provided below the RF electrode structure 240, to provide velocity matching, but is eliminated below the bias electrode structure 270, to reduce DC drift. Conveniently, since the bias electrode structure 270 is deposited directly on the substrate, the required drive (bias) voltage is significantly reduced. Unfortunately, in order to accommodate both electrode structures, the length of the modulator is significantly increased. In addition, this design is not ideal for Z-cut $LiNbO_3$, wherein the waveguides are located directly below the bias electrodes, because the highly conductive bias electrode material (e.g., Au) may introduce significant optical loss.

In Z-cut $LiNbO_3$ modulators, dc drift has been reduced by modifying the buffer layer. For example in U.S. Pat. Nos. 5,404,412 and 5,680,497, the effect of the buffer layer charging in optical modulators is reduced by doping the buffer layer, causing it to be more conductive. The added conductivity in essence shorts out the buffer layer, preventing the buffer layer from charging up and stealing all of the applied voltage from the waveguides. Accordingly, a DC or slowly varying voltage applied to the signal electrode is able to control the bias point of the modulator over time. Unfortunately, it can be difficult to quantitatively control the introduction of the doping elements with a high reproducibility. Furthermore, water may be absorbed by the conductive buffer layer, changing its properties. In addition, the required drive (bias) voltage may be relatively high because the generated electric field must pass through the conductive buffer layer (e.g., which may be quite thick for Z-cut configurations). In US Patent Application Publication No. 2003/0133638, DC drift is reduced by implanting a $SiO_2$ buffer layer with fluorine ions. The negative fluorine ions ($F^-$) are believed to react with positive ions, such as lithium ($Li^+$) from the substrate, to form stable compounds such as LiF. The reduction in the number of mobile $Li^+$ ions then results in a reduction in DC drift. Again, the required drive (bias) voltage may be relatively high because the generated electric field must pass through the ion-implanted buffer layer (e.g., which may be quite thick for Z-cut configurations).

In US Patent Application Publication No. 2006/0023288 and U.S. Pat. No. 7,127,128, DC drift is reduced by providing a separate low-frequency bias electrode structure substantially aligned with an overlying RF electrode structure. For example, consider the prior art X-cut embodiment illustrated in FIGS. 3a and 3b, wherein a dielectric buffer layer 350 is provided below the RF electrode structure 340/342/344, to provide velocity matching, but is eliminated below the bias electrode structure 370/372/374, to reduce DC drift. Advantageously, this configuration provides a relatively short modulator (i.e., since the bias and RF electrode structures are stacked) with a relatively low drive voltage (i.e., since the bias electrode structure is deposited directly on the substrate 310). Further advantageously, the bias electrode structure 370/372/374 is fabricated from a material having a high resistivity, which is conductive at low frequencies and functions as a dielectric at high-frequencies. Accordingly, the bias electrode structure can be deposited on the substrate without introducing significant loss.

US Patent Application Publication No. 2006/0023288 also describes numerous low bias drift embodiments for Z-cut $LiNbO_3$ modulators. Referring to FIGS. 4a and 4b, the Z-cut embodiments typically include two bias signal electrodes, each of which is split into two separate elongated segments. More specifically, each segment of each split bias electrode 470/476 is shifted laterally to an opposite side of the corresponding waveguide segment 426/424. Again, a dielectric buffer layer 450 is provided below the bleed layer 460 and RF electrode structure 440, 442, 444, to provide velocity matching, but is eliminated below the bias electrode structure 470, 472, 474, 476, to reduce DC drift. Advantageously, this configuration provides a relatively short modulator (i.e., since the bias and RF electrode structures are stacked) with a relatively low drive voltage (i.e., since the bias electrode structure is deposited directing on the substrate 410). Further advantageously, since the bias signal electrodes 470, 476 are split, and are not disposed directly over the interferometer arms 426, 424, respectively, optical loss is reduced.

Yet another advantage of many of the embodiments described in US Patent Application Publication No. 2006/0023288 is improved humidity tolerance. As is well known in the art, the presence of high magnitude electric fields and high humidity often results in corrosion of electro-optic devices. For example, when a metal adhesion layer (e.g., Ti, Ti/W, Cr, etc) is used to promote adhesion between an RF electrode (e.g., Au) and an electro-optic substrate (e.g., $LiNbO_3$), any moisture in direct contact with the multi-layer structure will serve as an electrolyte that induces galvanic corrosion. Galvanic corrosion, which results from the difference in electrochemical potentials of dissimilar metals, can create a conductive deposit between the surface RF electrodes, which causes current leakage, short circuit, or peeling of the RF electrodes. Various schemes have been proposed to obviate galvanic corrosion, and thus reduce the need for a hermetic package. For example, in U.S. Pat. No. 6,867,134 the adhesion layer is eliminated, whereas in US Patent Application Publication No. 2003/0062551 the adhesion layer is encapsulated. Alternatively, the adhesion layer can be made of a thin metal, such as nickel, which has a work function similar to gold. While these methods do suppress galvanic corrosion, electro-migration corrosion can still occur. Electro-migration corrosion occurs when a large DC voltage is applied across closely-spaced electrodes (e.g., gold RF electrodes) in the presence of water or a high humidity level. Similar to galvanic corrosion, electro-migration corrosion negatively impacts the performance and reduces the service life of electro-optic devices. As a result, electro-optic devices are often coated as shown in U.S. Pat. No. 6,560,377 and/or sealed in hermetic packages. However, the coatings negatively impact the RF properties of the RF electrode, and hermetic packaging adds cost to the modulator.

In US Patent Application Publication No. 2006/0023288 humidity tolerance is increased in various ways. For example in some embodiments, the large DC voltage is applied to bias electrodes that are disposed beneath a buffer layer, whereas in other embodiments the large DC voltage is applied to bias electrodes that are disposed below the substrate. Since these buried bias electrodes are protected from humidity, electro-migration corrosion of the buried bias electrodes is reduced. Moreover, if the buried bias electrodes are DC isolated from the RF electrodes, then electro-migration corrosion of the RF electrodes is also minimized. Furthermore, if the adhesion layer is eliminated, encapsulated, and/or formed of a material with a work function similar to that used to form the RF electrode, then both galvanic and electro-migration corrosion mechanisms are eliminated, enabling low cost non-hermetic packaging of the modulator.

In addition, improved humidity tolerance is also provided by fabricating the bias electrodes from a high resistivity material (e.g., a material having an electrical resistivity substantially higher than that of the RF electrodes, but substantially lower than the substrate). Notably, these high resistivity bias electrodes have been found to be significantly more robust than prior art high-conductivity bias electrodes (e.g., fabricated from gold).

SUMMARY OF THE INVENTION

The instant inventors have found that electro-optic devices having a separate bias electrode structure, as for example disclosed in US Patent Application Publication No. 2006/0023288, may exhibit improved performance if a thin buffer layer is provided between the bias signal electrode(s) and the substrate.

According to one aspect of the present invention there is provided an electro-optic device comprising: an electro-optic substrate having an optical waveguide formed therein; an RF electrode structure disposed for generating an RF electric field in the optical waveguide, the RF electrode structure including a first RF electrode; a first buffer layer disposed between the substrate and the first RF electrode; a bias electrode structure disposed for generating a low frequency or DC electric field in the optical waveguide, the bias electrode structure including a first bias electrode at least partially disposed between the first buffer layer and the first RF electrode; and a second buffer layer disposed between the first RF electrode and the first bias electrode.

According to one aspect of the present invention there is provided a method of fabricating an electro-optic device comprising: providing an electro-optic substrate having an optical waveguide formed therein; forming a first buffer layer on the electro-optic substrate; forming a bias electrode layer on at least one of the first buffer layer and the electro-optic substrate, the bias electrode layer patterned to provide a first bias electrode that at least partially extends over the first buffer layer; forming a second buffer layer on the bias electrode layer; and forming an RF electrode layer on the second buffer layer, the RF electrode layer patterned to include a first RF electrode.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 5A:
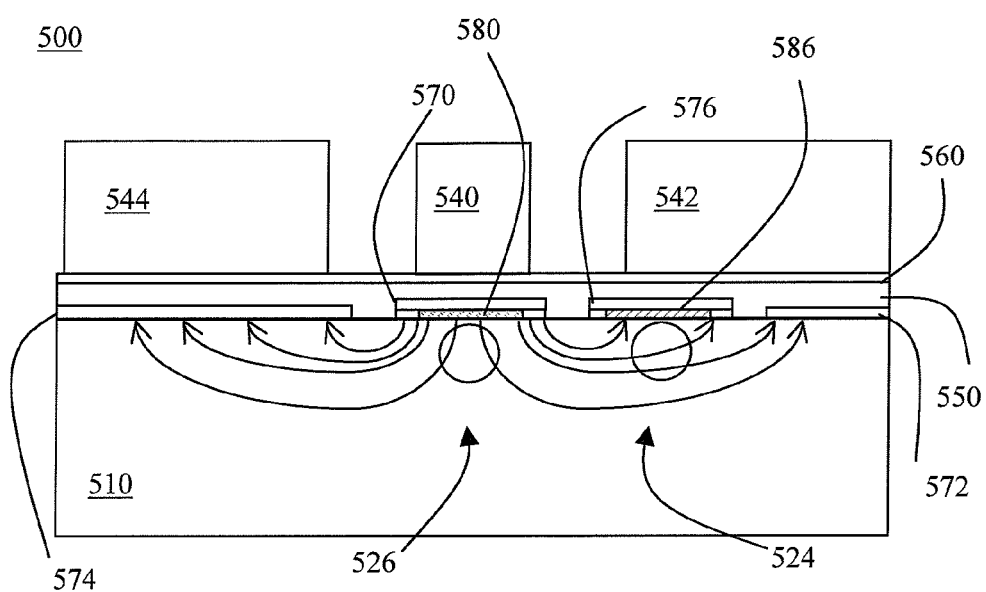
FIG. 5a is a sectional view of an electro-optic device in accordance with one embodiment of the instant invention.

Referring to FIG. 5*a*, there is shown a sectional view of an electro-optic device in accordance with one embodiment of the instant invention. The electro-optic device 500 includes a substrate 510, first 524 and second 526 optical waveguides, an RF signal electrode 540, RF ground electrodes 542, 544, an upper buffer layer 550, a bleed layer 560, first 570 and second 576 bias signal electrodes, bias ground electrodes 572, 574, and a lower buffer layer 580, 586.

In this embodiment, the substrate 510 is fabricated from an electro-optic material such as Z-cut lithium niobate ($LiNbO_3$). Alternatively, the substrate is fabricated from another electro-optic material, such as Z-cut lithium tantalite ($LiTaO_3$). The width, length, and thickness of the substrate 510 typically vary with the type of electro-optic device. For example, substrates for conventional Mach-Zehnder modulators are often about 40 mm long, 2 mm wide, and 1 mm thick. Of course, other dimensions are also possible.

The first 524 and second 526 optical waveguides are embedded in, or otherwise supported by, the substrate 510. The optical waveguides 524, 526 may be fabricated using one of various well-known methods, such as titanium diffusion or annealed proton exchange. For example, in one embodiment the waveguides 524, 526 are formed by patterning titanium in or on a Z-cut $LiNbO_3$ substrate, followed by subjecting the substrate to increased temperatures to allow the titanium to diffuse therein. Conventionally, titanium diffused $LiNbO_3$ provides waveguide(s) that are about 7 μm wide and about 3 μm deep. The pattern used to form the waveguides 524, 526 is dependent on the type of electro-optic device. For example, if the electro-optic device is a Mach-Zehnder modulator, the pattern may be similar to that illustrated in FIG. 5*b*. Alternatively, if the electro-optic device is an optical switch or a tunable directional coupler, the pattern may be similar to that illustrated in FIG. 5*c* or 5*d*, respectively. Further alternatively, the pattern may correspond to another electro-optic device having two substantially parallel waveguides or waveguide segments. In each case, the sectional view along any of lines A-A would correspond to FIG. 5*a*. Notably, FIGS. 5*b*, 5*c*, and 5*d* only show the waveguide patterns (dotted lines) and an exemplary RF electrode structure (thatched structure) to simplify the illustrations (e.g., the buffer layer and/or the bias electrodes are omitted from the figures).

Figure 5B:
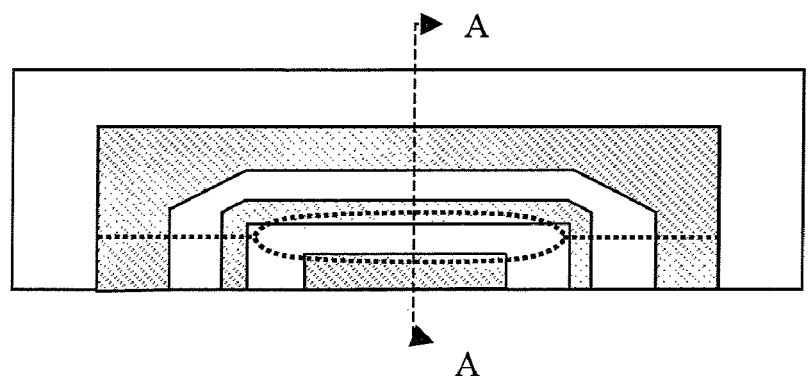
FIG. 5b is a plan view of the electro-optic device in FIG. 5a illustrating an embodiment where the optical waveguides are patterned to form a Mach-Zehnder interferometer.
Figure 5C:
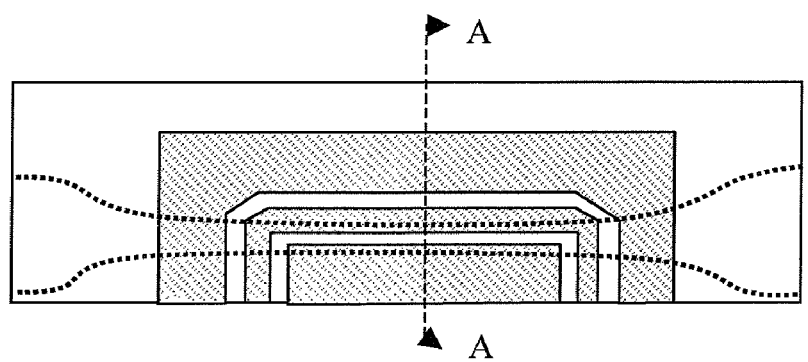
FIG. 5c is a plan view of the electro-optic device in FIG. 5a illustrating an embodiment where the optical waveguides are patterned to form a 2×2 optical switch.
Figure 5D:
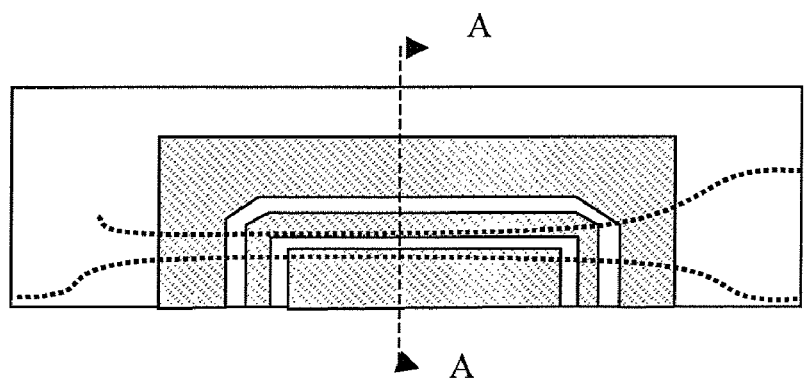
FIG. 5d is a plan view of the electro-optic device in FIG. 5a illustrating an embodiment where the optical waveguides are patterned to form an optical coupler.

The RF signal electrode 540 and the RF ground electrodes 544, 542 are supported by an substrate 510. The RF electrodes 540, 542, 544 are part of an RF electrode structure used to apply a high-frequency RF voltage across the waveguides 524, 526. For example, in one embodiment the RF electrode structure forms a traveling-wave electrode structure used to propagate a microwave signal that generates oppositely oriented electric fields in the first 524 and second 526 optical waveguides. The RF signal electrode 540 and RF ground electrode 542 are positioned substantially over the waveguides 526, 524, respectively. The RF electrodes 540, 542, 544 are typically formed from a material that exhibits high electrical conductivity such as gold (Au), copper (Cu), silver (Ag), or platinum (Pt). Since these metals do not always readily adhere to conventional bleed layer materials, an adhesion layer is optionally used to promote adhesion. Some examples of suitable adhesion layers include thin film layers of chromium (Cr), titanium (Ti), titanium-tungsten (Ti/W), etc. Alternatively, the adhesion layer is formed from a metal that has a work function similar to the RF electrode material (e.g., nickel (Ni) has a work function similar to that of Au). As discussed above, a matched work function assures that little if any voltage potential arises across the two metals, thus reducing galvanic corrosion. Alternatively, the adhesion layer is encapsulated as described in US Patent Application Publication No. 2003/0062551, or eliminated as described in U.S. Pat. No. 6,867,134, by activating the surface. While the RF electrode structures illustrated in FIGS. 5*b*, 5*c*, 5*d*, show one example of a suitable electrode design (e.g., known as coplanar waveguide), other designs are also possible (e.g., conventional coplanar strip, asymmetric coplanar strip, etc.). The RF electrode structure 540, 542, 544, which in one embodiment is about 15-40 μm high, may be fabricated using one of various well-known methods, such as electroplating, sputtering, evaporation, plasma etching, liftoff, etc.

The upper buffer layer 550 is provided to reduce optical losses due to absorption from the RF electrodes and to provide velocity matching between the optical signal and the RF signal. Accordingly, the upper buffer layer 550 is typically fabricated with a material that is optically transparent in the wavelength of interest (e.g., 1.55 microns) and has a dielectric constant that is lower than the dielectric constant of the substrate 510. For example, in one embodiment the buffer layer 550 is fabricated with silicon dioxide ($SiO_2$). In another embodiment, the buffer layer 550 is fabricated with benzocyclobutene (BCB). In general, the resistivity of the buffer layer 550 will be in the range from about $10^{17}$-$10^{19}$ Ω-cm @25° C., but could be higher. Using a substantially non-conductive material also allows the buffer layer 550 to provide electrical insulation between the bias signal electrodes and/or between the bias signal electrodes and the RF signal electrode. The buffer layer 550 is typically fabricated using one of various well-known methods, such vacuum deposition, ion-assist vacuum deposition, sputtering, or chemical vapor deposition (CVD). In one embodiment, the buffer layer 550 is planarized throughout the wafer. In another embodiment, the buffer layer 550 is patterned so as to cover only the bias electrode structure. In yet another embodiment, the buffer layer 550 is patterned to cover only the bias signal electrodes. The thickness of the upper buffer layer 550 is typically in the range between about 0.05 and 2 μm, and more commonly between about 0.4 and 1.0 μm. Notably, conventional $SiO_2$ buffer layers are often subject to an annealing step after deposition. Optionally, this annealing step is eliminated to prevent damage to the bias electrode.

The bleed layer 560 is used to bleed off electric charge created by the pyroelectric effect. Accordingly, the bleed layer 560, which is used to dissipate the accumulated electric charge, is typically formed from an electrically conductive film. Preferably, the film is formed from a semiconductor to prevent shorting out the RF electrodes. Some examples of suitable materials for the slightly conductive film 560 include tantalum silicon nitride (TaSiN), titanium silicon nitride (Ti-SiN), silicon titanium oxynitride (SiTiON), amorphous or polycrystalline silicon (Si), etc. Conveniently, when the bleed layer 560 is formed from materials such as TaSiN, the highly resistive bleed layer also serves as a moisture barrier that prevents impurities from entering the buffer layer and/or prevents voltage induced ion migration near the bias electrodes. Accordingly, the electro-optical device could be described as a humidity tolerant and/or atmospheric tolerant electro-optic device. In addition, when the bleed layer 560 is formed from a material such as TaSiN, the RF electrodes may be deposited directly on the bleed layer (i.e., in the absence of an adhesion layer or an activated surface), thus simplifying the manufacturing process and further improving humidity tolerance. Note that the term TaSiN, as used herein, corresponds to a chemical composition that may be complex, and that is not necessarily represented by the 1:1:1 ratio suggested in the abbreviated chemical name (e.g., the actual formula may be more accurately represented by $Ta_xSi_yN_z$). The bleed layer 560 is typically fabricated using one of various well-known methods, such vacuum deposition, ion-assist vacuum deposition, sputtering, or chemical vapor deposition (CVD). The thickness of the bleed layer 560 is typically in the range between about 0.05 and 0.5 µm, and more commonly between about 0.05 and 0.25 µm.

The first bias signal electrode 570, the second bias signal electrode 576, the first bias ground electrode 574, and the second bias ground electrode 572, are all supported by the substrate 510. The bias electrodes 570, 572, 574, 576 are part of the bias electrode structure used to apply a low-frequency or DC voltage across the optical waveguides. Each of the first 570 and second 576 bias signal electrodes includes a lower split portion disposed directly on the substrate and an upper cap section, which bridges the corresponding lower split portion.

Each of the bias electrodes 570, 572, 574, 576 is typically formed from a high-resistivity material, such as tantalum silicon nitride (TaSiN), amorphous silicon (Si), indium oxide ($In_2O_3$), tin oxide ($SnO_2$), zinc oxide (ZnO), etc. Using a high resistivity electrode material allows the bias electrodes 570, 572, 574, 576 to be conductive at low frequencies and to function as a dielectric at high-frequencies. Accordingly, the bias electrodes are effectively transparent to the electric field generated by the RF electrodes. Suitable resistivity values for the bias electrode material lie between that of the RF electrode material and that of the substrate. For example, TaSiN typically has a resistivity in the range of about ~$10^4$ to $10^6$ Ω-cm @25° C., which is between $2.3 \times 10^{-6}$ Ω-cm @25° C. (Au) and ~$1.3 \times 10^{17}$ Ωcm @25° C. ($LiNbO_3$). Preferably, the resistivity of the bias electrode material is in the range from about 1 to $10^8$ ohm-cm (Ω-cm) @25° C., more preferably from about $10^2$ to $10^7$ ohm-cm (Ω-cm) @25° C., and most preferably from about $10^4$ to $10^6$ ohm-cm (Ω-cm) @25° C. The preferred range is determined by the fact that lower resistivity materials typically provide faster response times, whereas higher resistivity materials result in reduced optical loss due to the proximity of the bias electrode to the waveguide(s). The use of a higher resistivity bias electrode material may also reduce coupling with the RF signal, thus decreasing the net RF loss per unit length of the RF signal electrode. Each of the bias electrodes 570, 572, 574, 576 may be formed from the material used to form the bleed layer 560, or a different material. Conveniently, when the bias electrodes 570, 572, 574, 576 and the bleed layer 560 are fabricated from the same material (e.g., TaSiN), the fabrication process is relatively simple. The bias electrodes 570, 572, 574, 576 may be fabricated using one of various well-known methods, including deposition and sputtering. The thickness of the bias electrodes 570, 572, 574, 576 is typically in the range between about 0.05 and 0.5 µm, and more commonly between about 0.05 and 0.25 µm.

The lower buffer layer 580, 586 provides a spacer between the optical waveguides 526, 524 and the overlying upper cap section of the bias signal electrodes 570, 576, respectively. Accordingly, the lower buffer layer 580, 586 is typically fabricated with a material that is optically transparent in the wavelength of interest (e.g., 1.55 microns). In one embodiment, the lower buffer layer 580, 586 is fabricated with a substantially non-conductive dielectric material, such as silicon dioxide ($SiO_2$) or benzocyclobutene (BCB). In another embodiment, the lower buffer layer 580, 586 is fabricated from a dielectric material, such as $SiO_2$, which has been sputtered such that it exhibits a small amount of intrinsic conductivity. In yet another embodiment, the lower buffer layer 580, 586 is fabricated with a dielectric material having small amount of conductivity, such as doped or ion implanted $SiO_2$. In general, the resistivity of the lower buffer layer will be in the range from about $10^{17}$-$10^{19}$ Ω-cm @25° C. The lower buffer layer 580, 586 is typically fabricated using one of various well-known methods, such vacuum deposition, ion-assist vacuum deposition, sputtering, or chemical vapor deposition (CVD). The thickness of the lower buffer layer 580, 586 is typically in the range between about 0.05 and 1 µm, and more commonly between about 0.1 and 0.5 µm. The lower buffer layer may require an annealing step after deposition if formed from $SiO_2$.

According to one embodiment of the instant invention, the electro-optic device 500 is fabricated by first depositing the lower buffer layer material, which is subsequently annealed and etched to form the lower buffer layer 580, 586, and secondly depositing the bias electrode material, which is subsequently etched to form the bias electrodes 570, 572, 574, 576. In this embodiment, the bias signal electrodes 570, 576 have been shown having a substantially bracket-shaped (i.e., [-shaped) cross section. In other embodiments, the bias signal electrodes 570, 576 may have a substantially U-shaped cross-section such that they provide a conformal coating for each region of the lower buffer layer. In each instance, the lower split portions and upper cap section of each bias signal electrode 570, 576 substantially encapsulate the first 580 and second 586 regions of lower buffer layer, respectively.

Advantageously, the upper cap sections, which extend over the waveguides 526, 524, significantly enhance the bias electrode modulation efficiency. In addition, the lower split portions not only contribute to the applied field, but also help to limit any ionic conduction in the lower buffer layer 580, 586, which would counteract the applied field from each bias signal electrode 570, 576. More specifically, encapsulation of the lower buffer layer by the bias electrode prevents ions from traveling horizontally from a region near one bias electrode to a region near the other bias electrode. However, such an encapsulation does not prevent ion/electron migration from occurring vertically within the lower buffer layer. The lower buffer layer 580, 586 helps reduce loss of the optical mode associated with the cap sections of the bias signal electrodes 570, 576.

The performance of the electro-optic device 500 is generally dependent on the thickness of the lower buffer layer 580, 586 and its conductivity. For example, while thinner lower buffer layers are associated with increased bias electrode modulation efficiency, they are also associated with increased optical loss. Similarly, while low resistivity materials are associated with increased bias electrode modulation efficiency and faster response time, they are also generally associated with increased optical loss. With regard to the former, the bias signal electrodes 570, 576 may introduce optical loss if the lower buffer layer 580, 586 is not thick enough to optically isolate the optical mode in the waveguides 526, 524 from the cap sections of the bias signal electrodes 570, 576.

Figure 6:
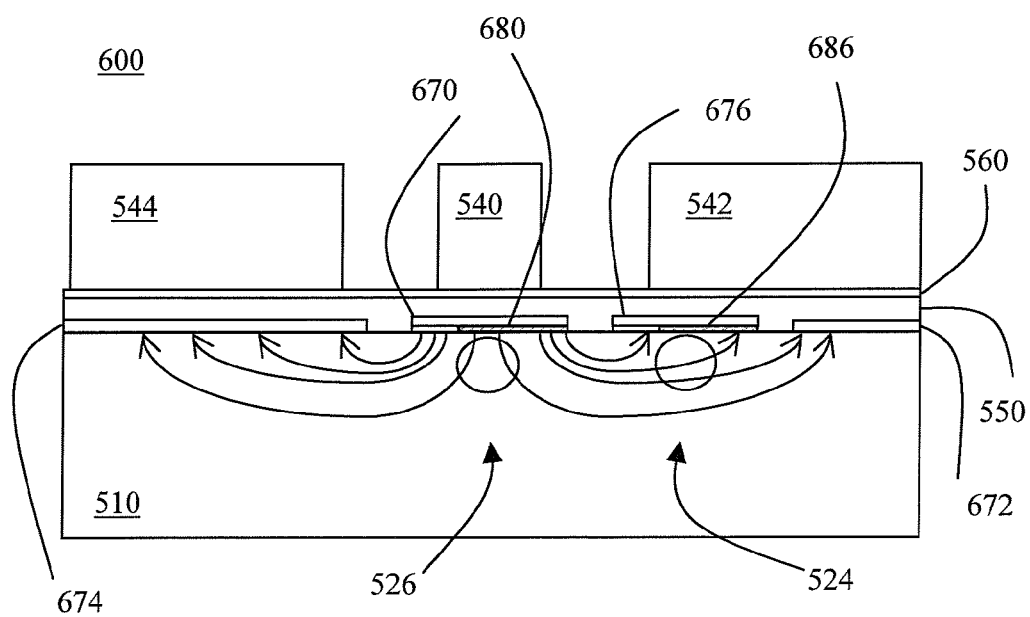
FIG. 6 is a sectional view of an electro-optic device in accordance with another embodiment of the instant invention having a patterned lower buffer layer.

Referring to FIG. 6, there is shown a sectional view of an electro-optic device in accordance with other embodiment of the instant invention. The electro-optic device 600 includes a substrate 510, first 524 and second 526 optical waveguides, an RF signal electrode 540, RF ground electrodes 542, 544, an upper buffer layer 550, a bleed layer 560, first 670 and second 676 bias signal electrodes, bias ground electrodes 672, 674, and a lower buffer layer 680, 686.

The substrate 510, first 524 and second 526 optical waveguides, RF signal electrode 540, RF ground electrodes 542, 544, upper buffer layer 550, and bleed layer 560, are as described above.

The first bias signal electrode 670, the second bias signal electrode 676, the first bias ground electrode 674, and the second bias ground electrode 672, are all supported by the substrate 510. The bias electrodes 670, 672, 674, 676 are part of the bias electrode structure used to apply a low-frequency or DC voltage across the optical waveguides. Each of the first 670 and second 676 bias signal electrodes includes a lower portion disposed directly on the substrate and an upper portion, which covers the lower portion and extends over the first 680 and second 686 regions of the lower buffer layer, respectively.

Each of the bias electrodes 670, 672, 674, 676 is typically formed from a high-resistivity material, such as tantalum silicon nitride (TaSiN), amorphous silicon (Si), indium oxide ($In_2O_3$), tin oxide ($SnO_2$), zinc oxide (ZnO), etc. Using a high resistivity material allows the bias electrodes 670, 672, 674, 676 to be conductive at low frequencies and to function as a dielectric at high-frequencies. Accordingly, the bias electrodes are effectively transparent to the electric field generated by the RF electrodes. Suitable resistivity values for the bias electrode material lie between that of the RF electrode material and that of the substrate. For example, TaSiN typically has a resistivity in the range of about $10^4$ to $10^6 \Omega$-cm @25° C., which is between ~$2.3 \times 10^{-6} \Omega$-cm @25° C. (Au) and ~$1.3 \times 10^{17} \Omega$-cm @25° C. ($LiNbO_3$). Preferably, the resistivity of the bias electrode material is in the range from about 1 to $10^8$ ohm-cm ($\Omega$-cm) @25° C., more preferably from about $10^2$ to $10^7$ ohm-cm ($\Omega$-cm) @25° C., and most preferably from about $10^4$ to $10^6$ ohm-cm ($\Omega$-cm) @25° C. The preferred range is determined by the fact that lower resistivity materials typically provide faster response times, whereas higher resistivity materials result in reduced optical loss due to the proximity of the bias electrode to the waveguide(s). The use of a higher resistivity bias electrode material may also reduce coupling with the RF signal, thus decreasing the net RF loss per unit length of the RF signal electrode. Each of the bias electrodes 670, 672, 674, 676 may be formed from the material used to form the bleed layer 560, or a different material. Conveniently, when bias electrodes 670, 672, 674, 676 and the bleed layer are fabricated from the same material (e.g., TaSiN), the fabrication process is relatively simple. The bias electrodes 670, 672, 674, 676 may be fabricated using one of various well-known methods, including deposition and sputtering. The thickness of the bias electrodes 670, 676 is typically in the range between about 0.05 and 0.5 µm, and more commonly between about 0.05 and 0.25 µm.

The lower buffer layer 680, 686 provides a spacer between the optical waveguides 526, 524 and the overlying upper portions of the bias signal electrodes 670, 676, respectively. Accordingly, the lower buffer layer 680, 686 is typically fabricated with a material that is optically transparent in the wavelength of interest (e.g., 1.55 microns). In one embodiment, the lower buffer layer 680, 686 is fabricated with a substantially non-conductive dielectric material, such as silicon dioxide ($SiO_2$) or benzocyclobutene (BCB). In another embodiment, the lower buffer layer 680, 686 is fabricated from a dielectric material, such as $SiO_2$, which has been sputtered such that it exhibits a small amount of intrinsic conductivity. In yet another embodiment, the lower buffer layer 680, 686 is fabricated with a dielectric material having small amount of conductivity, such as doped or ion implanted $SiO_2$. In general, the resistivity of the lower buffer layer will be in the range from about $10^7$-$10^{19} \Omega$cm @25° C. The lower buffer layer 680, 686 is typically fabricated using one of various well-known methods, such vacuum deposition, ion-assist vacuum deposition, sputtering, or chemical vapor deposition (CVD). The thickness of the lower buffer layer 680, 686 is typically in the range between about 0.05 and 1 µm, and more commonly between about 0.1 and 0.5 µm. The lower buffer layer may require an annealing step after deposition if formed from $SiO_2$.

According to one embodiment of the instant invention, the electro-optic device 600 is fabricated by first depositing the lower buffer layer material, which is subsequently annealed and etched to form the lower buffer layer 680, 686, and secondly depositing the bias electrode material, which is subsequently etched to form the bias electrodes 670, 672, 674, 676. In this embodiment, the bias signal electrodes 670, 676 have been shown having a substantially L-shaped cross section. In other embodiments, the top left corners of the bias signal electrodes 670, 676 may be rounder. In other embodiments, the thickness of the bias electrodes is constant, conforming to the shape of the lower buffer layer.

Advantageously, the upper portions, which extend over the waveguides 526, 524, significantly enhance the bias electrode modulation efficiency. The lower portions not only contribute to the applied field, but also help to limit any horizontal ionic conduction in the lower buffer layers 680, 686, which would counteract the applied field from each bias signal electrode 670, 676. The lower buffer layer 680, 686 helps reduce loss of the optical mode associated with the upper portions of the bias signal electrodes 670, 676.

Further advantageously, since the bias signal electrodes 670, 676 have a substantially L-shaped cross section rather than the bracket-shaped cross section illustrated in FIG. 5a, optical loss is reduced. In particular, optical loss is reduced because optical loading created by one half of the lower split portion is eliminated. Note, that while the substantially L-shaped cross section provides reduced optical loss, it may also provide a small reduction in modulation efficiency.

In this embodiment, the bias signal electrodes 670, 676 are fabricated such that the lower portions of each bias electrode 670, 676 are disposed to the same side of the device (e.g. to the left of the waveguides 524, 526, respectively). As a result, symmetry of the optical loading is advantageously maintained even if misalignment errors occur during the manufacturing process. For example, if the narrow lower portions of each bias electrode 670, 676 are deposited too far to the left in FIG. 6, then the effects will be felt equally in both optical waveguides 524, 526.

Figure 7:
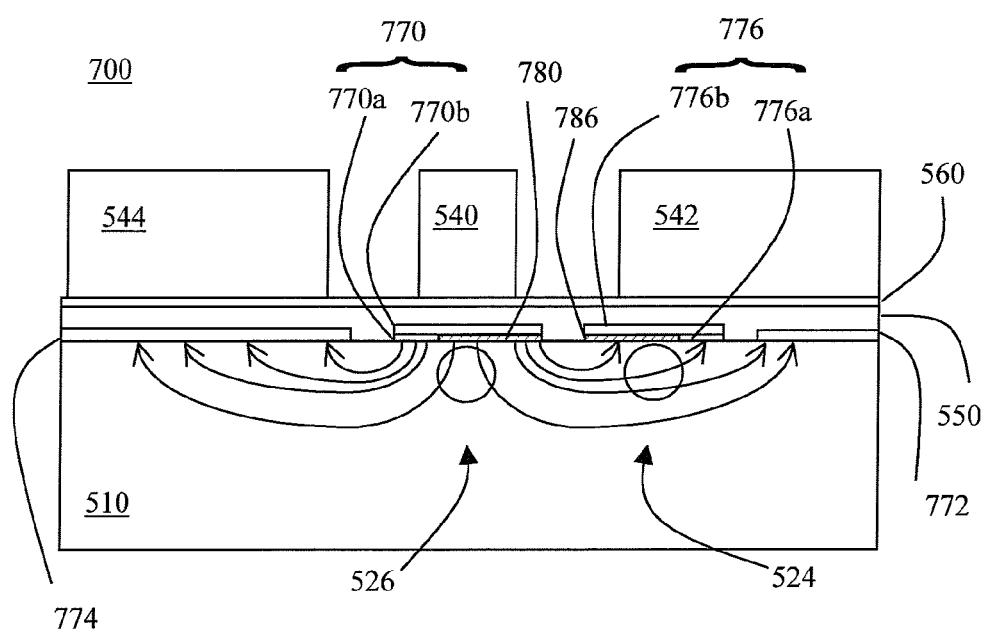
FIG. 7 is a sectional view of an electro-optic device in accordance with another embodiment of the instant invention having a patterned lower buffer layer.

Referring to FIG. 7, there is shown a sectional view of an electro-optic device in accordance with other embodiment of the instant invention. The electro-optic device 700 includes a substrate 510, first 524 and second 526 optical waveguides, an RF signal electrode 540, RF ground electrodes 542, 544, an upper buffer layer 550, a bleed layer 560, first 770 and second 776 bias signal electrodes, bias ground electrodes 772, 774, and a lower buffer layer 780, 786.

The substrate 510, first 524 and second 526 optical waveguides, RF signal electrode 540, RF ground electrodes 542, 544, upper buffer layer 550, and bleed layer 560, are as described above.

The first bias signal electrode 770, the second bias signal electrode 776, the first bias ground electrode 774, and the second bias ground electrode 772, are all supported by the substrate 510. The bias electrodes 770, 772, 774, 776 are part of the bias electrode structure used to apply a low-frequency or DC voltage across the optical waveguides. Each of the first 770 and second 776 bias signal electrodes includes a lower portion disposed directly on the substrate and an upper portion, which covers the lower portion and extends over the first 780 and second 786 regions of the lower buffer layer, respectively. More specifically, the first 770 bias signal electrode includes a lower portion 770a and an upper portion 770b, whereas the second 776 bias signal electrode includes a lower portion 776a and an upper portion 776b.

Each of the bias electrodes 770, 772, 774, 776 is typically formed from a high-resistivity material, such as tantalum silicon nitride (TaSiN), amorphous silicon (Si), indium oxide ($In_2O_3$), tin oxide ($SnO_2$), zinc oxide (ZnO), etc. Using a high resistivity material allows the bias electrodes 770, 772, 774, 776 to be conductive at low frequencies and to function as a dielectric at high-frequencies. Accordingly, the bias electrodes are effectively transparent to the electric field generated by the RF electrodes. Suitable resistivity values for the bias electrode material lie between that of the RF electrode material and that of the substrate. For example, TaSiN typically has a resistivity in the range of about $10^4$ to $10^6 \Omega$-cm @25° C., which is between ~$2.3 \times 10^{-6} \Omega$-cm @25° C. (Au) and ~$1.3 \times 10^{17} \Omega$-cm @25° C.($LiNbO_3$). Preferably, the resistivity of the bias electrode material is in the range from about 1 to $10^8$ ohm-cm ($\Omega$-cm) @25° C., more preferably from about $10^2$ to $10^7$ ohm-cm ($\Omega$-cm) @25° C., and most preferably from about $10^4$ to $10^6$ ohm-cm ($\Omega$-cm) @25° C. The preferred range is determined by the fact that lower resistivity materials typically provide faster response times, whereas higher resistivity materials result in reduced optical loss due to the proximity of the bias electrode to the waveguide(s). The use of a higher resistivity bias electrode material may also reduce coupling with the RF signal, thus decreasing the net RF loss per unit length of the RF signal electrode. Each of the bias electrodes 770, 772, 774, 776 may be formed from the material used to form the bleed layer 560, or a different material. Conveniently, when the bias electrodes 770, 772, 774, 776 and the bleed layer are fabricated from the same material (e.g., TaSiN), the fabrication process is relatively simple. The bias electrodes 770, 772, 774, 776 may be fabricated using one of various well-known methods, including deposition and sputtering. The thickness of the bias electrodes 770, 776 is typically in the range between about 0.05 and 0.5 μm, and more commonly between about 0.05 and 0.25 μm.

The lower buffer layer 780, 786 provides a spacer between the optical waveguides 526, 524 and the overlying upper portions of the bias signal electrodes 770, 776, respectively. Accordingly, the lower buffer layer 780, 786 is typically fabricated with a material that is optically transparent in the wavelength of interest (e.g., 1.55 microns). In one embodiment, the lower buffer layer 780, 786 is fabricated with a substantially non-conductive dielectric material, such as silicon dioxide ($SiO_2$) or benzocyclobutene (BCB). In another embodiment, the lower buffer layer 780, 786 is fabricated from a dielectric material, such as $SiO_2$, which has been sputtered such that it exhibits a small amount of intrinsic conductivity. In yet another embodiment, the lower buffer layer 780, 786 is fabricated with a dielectric material having small amount of conductivity, such as doped or ion implanted $SiO_2$. In general, the resistivity of the lower buffer layer will be in the range from about $10^{17}$-$10^{19} \Omega$-cm @25° C. The lower buffer layer 780, 786 is typically fabricated using one of various well-known methods, such vacuum deposition, ion-assist vacuum deposition, sputtering, or chemical vapor deposition (CVD). The thickness of the lower buffer layer 780, 786 is typically in the range between about 0.05 and 1 μm, and more commonly between about 0.1 and 0.5 μm. The lower buffer layer may require an annealing step after deposition if formed from $SiO_2$.

According to one embodiment of the instant invention, the electro-optic device 700 is fabricated by first depositing the lower buffer layer material, which is subsequently annealed and etched to form the lower buffer layer 780, 786, and secondly depositing the bias electrode material, which is subsequently etched to form the bias electrodes 770, 772, 774, 776. In this embodiment, the bias signal electrodes 770, 776 have been shown having a substantially L-shaped cross section. In other embodiments, the outer corners of the bias signal electrodes 770, 776 may be rounder. In other embodiments, the thickness of the bias electrodes is constant, conforming to the shape of the lower buffer layer.

Advantageously, the upper portions, which extend over the waveguides 526, 524, significantly enhance the bias electrode modulation efficiency. The lower portions not only contribute to the applied field, but also help to limit any horizontal ionic conduction in the lower buffer layers 780, 786, which would counteract the applied field from each bias signal electrode 770, 776. The lower buffer layer 780, 786 helps reduce loss of the optical mode associated with the upper portions of the bias signal electrodes 770, 776.

Further advantageously, since the bias electrodes 770, 776 have a substantially L-shaped cross section rather than the bracket-shaped cross section illustrated in FIG. 5a, optical loss is reduced. In particular, optical loss is reduced because optical loading created by one half of the lower split portion is eliminated. Note that while the substantially L-shaped cross section does provide reduced optical loss, it may also cause a small reduction in modulation efficiency.

In this embodiment, the bias electrodes 770, 776 are fabricated such that the lower portions 770a, 776a of each bias electrode 770, 776 are disposed on opposite sides of the device (e.g., such that they are shifted laterally to the outside of the waveguides 524, 526). As a result, the electro-optic device may be easier to fabricate for embodiments where the waveguides 526, 524 are close together (e.g., optical couplers and/or optical switches). In addition, alignment between the lower portions 770a, 776a and the upper portions 770b, 776b, respectively, may be less critical. For example, if the upper portions 770b, 776b are deposited too far to the right in the embodiment illustrated in FIG. 7, then it would not result in a short between the two bias signal electrodes as it would in the analogous scenario for the embodiment illustrated in FIG. 6.

Figure 8:
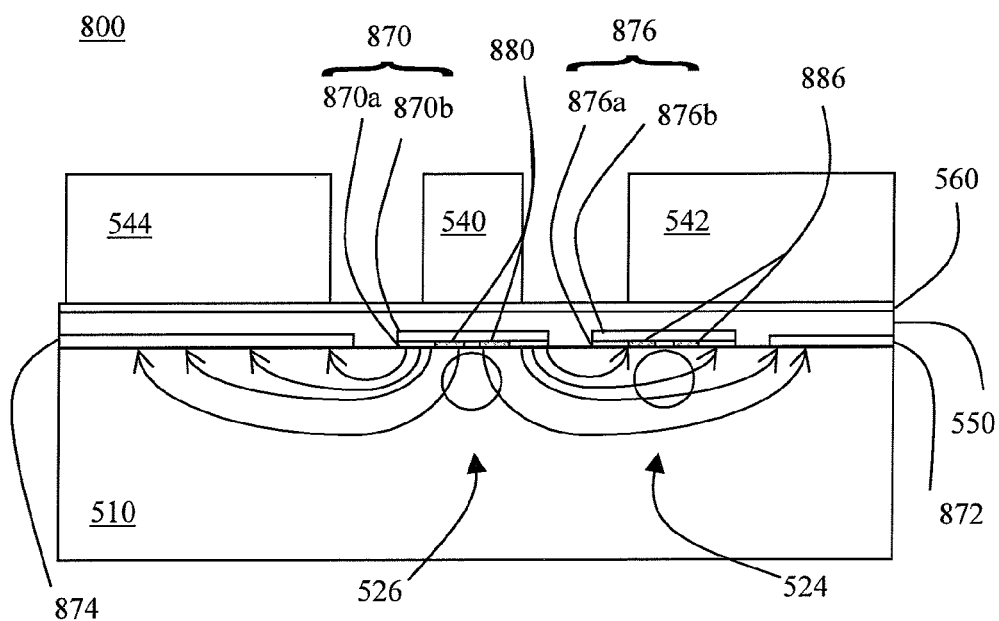
FIG. 8 is a sectional view of an electro-optic device in accordance with another embodiment of the instant invention having a patterned lower buffer layer.

Referring to FIG. 8, there is shown a sectional view of an electro-ophic device in accordance with other embodiment of the instant invention. The electro-optic device 800 includes a substrate 510, first 524 and second 526 optical waveguides, an RF signal electrode 540, RF ground electrodes 542, 544, an upper buffer layer 550, a bleed layer 560, first 870 and second 876 bias signal electrodes, bias ground electrodes 872, 874, and a lower buffer layer 880, 886.

The substrate 510, first 524 and second 526 optical waveguides, RF signal electrode 540, RF ground electrodes 542, 544, upper buffer layer 550, and bleed layer 560, are as described above.

The first bias signal electrode 870, the second bias signal electrode 876, the first bias ground electrode 874, and the second bias ground electrode 872, are all supported by the substrate 510. The bias electrodes 870, 872, 874, 876 are part of the bias electrode structure used to apply a low-frequency or DC voltage across the optical waveguides. Each of the first 870 and second 876 bias signal electrodes includes a lower portion having three segments disposed directly on the substrate and an upper cap section. The center segment of each lower portion 870a, 876a splits the corresponding lower buffer layer into two parts. The cap sections 870b, 876b extend over the split buffer layers 880, 886, respectively, to bridge the lower portion segments.

Each of the bias electrodes 870, 872, 874, 876 is typically formed from a high-resistivity material, such as tantalum silicon nitride (TaSiN), amorphous silicon (Si), indium oxide ($In_2O_3$), tin oxide ($SnO_2$), zinc oxide (ZnO), etc. Using a high resistivity material allows the bias electrodes 870, 872, 874, 876 to be conductive at low frequencies and to function as a dielectric at high-frequencies. Accordingly, the bias electrodes are effectively transparent to the electric field generated by the RF electrodes. Suitable resistivity values for the bias electrode material lie between that of the RF electrode material and that of the substrate. For example, TaSiN typically has a resistivity in the range of about $10^4$ to $10^6$ $\Omega$-cm @25° C., which is between ~$2.3\times10^{-6}$ $\Omega$-cm @25° C. (Au) and ~$1.3\times10^{17}$ $\Omega$-cm @25° C.(LiNbO$_3$). Preferably, the resistivity of the bias electrode material is in the range from about 1 to $10^8$ ohm-cm ($\Omega$-cm) @25° C., more preferably from about $10^2$ to $10^7$ ohm-cm ($\Omega$-cm) @25° C., and most preferably from about $10^4$ to $10^6$ ohm-cm ($\Omega$-cm) @25° C. The preferred range is determined by the fact that lower resistivity materials typically provide faster response times, whereas higher resistivity materials result in reduced optical loss due to the proximity of the bias electrode to the waveguide(s). The use of a higher resistivity bias electrode material may also reduce coupling with the RF signal, thus decreasing the net RF loss per unit length of the RF signal electrode. Each of the bias electrodes 870, 872, 874, 876 may be formed from the material used to form the bleed layer 560, or a different material. Conveniently, when bias electrodes 870, 872, 874, 876 and the bleed layer are fabricated from the same material (e.g., TaSiN), the fabrication process is relatively simple. The bias electrodes 870, 872, 874, 876 may be fabricated using one of various well-known methods, including deposition and sputtering. The thickness of the bias electrodes 870, 876 is typically in the range between about 0.05 and 0.5 µm, and more commonly between about 0.05 and 0.25 µm.

The lower buffer layer 880, 886 provides a spacer between the optical waveguides 526, 524 and the overlying portions of the bias signal electrodes 870, 876, respectively. Accordingly, the lower buffer layer 880, 886 is typically fabricated with a material that is optically transparent in the wavelength of interest (e.g., 1.55 microns). In one embodiment, the lower buffer layer 880, 886 is fabricated with a substantially non-conductive dielectric material, such as silicon dioxide ($SiO_2$) or benzocyclobutene (BCB). In another embodiment, the lower buffer layer 880, 886 is fabricated from a dielectric material, such as $SiO_2$, which has been sputtered such that it exhibits a small amount of intrinsic conductivity. In yet another embodiment, the lower buffer layer 880, 886 is fabricated with a dielectric material having small amount of conductivity, such as doped or ion implanted $SiO_2$. In general, the resistivity of the lower buffer layer will be in the range from about $10^{17}$-$10^{19}$$\Omega$-cm @25° C. The lower buffer layer 880, 886 is typically fabricated using one of various well-known methods, such vacuum deposition, ion-assist vacuum deposition, sputtering, or chemical vapor deposition (CVD). The thickness of the lower buffer layer 880, 886 is typically in the range between about 0.05 and 1 µm, and more commonly between about 0.1 and 0.5 µm. The lower buffer layer may require an annealing step after deposition if formed from $SiO_2$.

According to one embodiment of the instant invention, the electro-optic device 800 is fabricated by first depositing the lower buffer layer material, which is subsequently annealed and etched to form the lower split buffer layers 880, 886, and secondly depositing the bias electrode material, which is subsequently etched to form the bias electrodes 870, 872, 874, 876. In this embodiment, the bias signal electrodes 870, 876 have been shown having a substantially E-shaped cross section. In other embodiments, the bias signal electrodes 870, 876 may provide a more conformal coating of the split lower buffer layers 880, 886, respectively.

Advantageously, the upper layers 870b, 876b, which extend over waveguides 526, 524, respectively, significantly enhance the bias electrode structure modulation efficiency. The lower portions 870a, 876a not only contribute to the applied field, but also help to limit any horizontal ionic conduction in the split buffer layers 880, 886, which would counteract the applied field from each bias signal electrode 870, 876. The lower split buffer layers 880, 886 help reduce loss of the optical mode due to the presence of the bias signal electrodes 870, 876.

Further advantageously, since the bias electrodes 870, 876 have a substantially E-shaped cross section rather than the bracket-shaped cross section illustrated in FIG. 5a, the center segment of the lower portions may significantly improve modulation efficiency. Preferably, the center segment of the lower portions 870a, 876a is relatively narrow such that it does not introduce excessive optical loss. For example, according to one embodiment the center segments of the lower portions 870a, 876a are much narrower than the corresponding outer segments.

Figure 9:
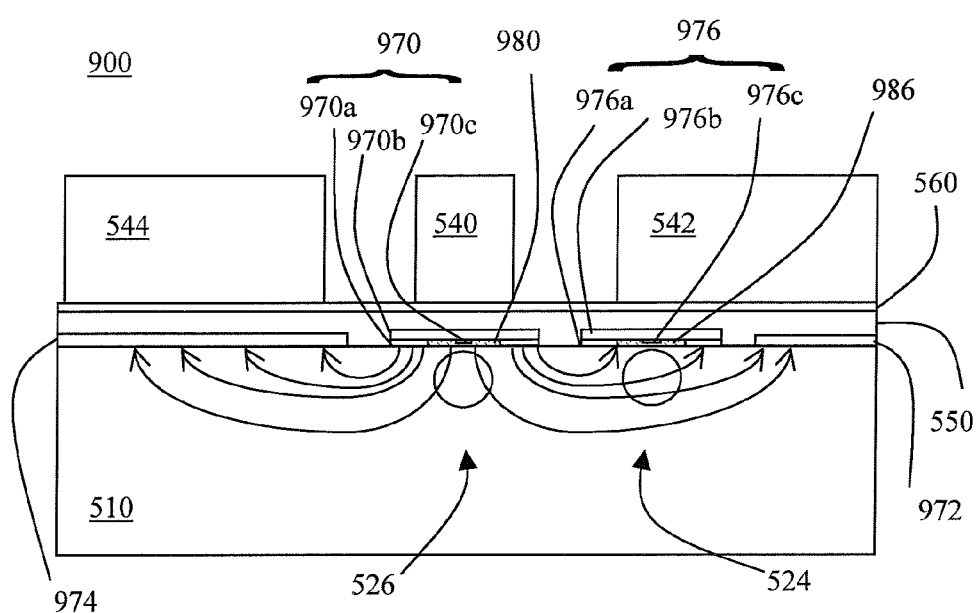
FIG. 9 is a sectional view of an electro-optic device in accordance with another embodiment of the instant invention having a patterned lower buffer layer.

Referring to FIG. 9, there is shown a sectional view of an electro-optic device in accordance with other embodiment of the instant invention. The electro-optic device 900 includes a substrate 510, first 524 and second 526 optical waveguides, an RF signal electrode 540, RF ground electrodes 542, 544, an upper buffer layer 550, a bleed layer 560, first 970 and second 976 bias signal electrodes, bias ground electrodes 972, 974, and a lower buffer layer 980, 986.

The substrate 510, first 524 and second 526 optical waveguides, RF signal electrode 540, RF ground electrodes 542, 544, upper buffer layer 550, and bleed layer 560, are as described above.

The first bias signal electrode 970, the second bias signal electrode 976, the first bias ground electrode 974, and the second bias ground electrode 972, are all supported by the substrate 510. The bias electrodes 970, 972, 974, 976 are part of the bias electrode structure used to apply a low-frequency or DC voltage across the optical waveguides. Each of the first 970 and second 976 bias signal electrodes includes a lower portion and an upper cap section. Each lower portion 970a, 976a includes two outer segments disposed directly on the substrate 510 and a center segment that is not in contact with the substrate 510. The upper cap sections 970b, 976b extend over the buffer layers 980, 986b, respectively, to bridge the outer segments and to provide contact with the center segment.

Each of the bias electrodes 970, 972, 974, 976 is typically formed from a high-resistivity material, such as tantalum silicon nitride (TaSiN), amorphous silicon (Si), indium oxide ($In_2O_3$), tin oxide ($SnO_2$), zinc oxide (ZnO), etc. Using a high resistivity material allows the bias electrodes 970, 972, 974, 976 to be conductive at low frequencies and to function as a dielectric at high-frequencies. Accordingly, the bias electrodes are effectively transparent to the electric field generated by the RF electrodes. Suitable resistivity values for the bias electrode material lie between that of the RF electrode material and that of the substrate. For example, TaSiN typically has a resistivity in the range of about $10^4$ to $10^6 \Omega$-cm @25° C., which is between ~$2.3 \times 10^{-6} \Omega$-cm @25° C. (Au) and ~$1.3 \times 10^{17} \Omega$-cm @25° C. ($LiNbO_3$). Preferably, the resistivity of the bias electrode material is in the range from about 1 to $10^8$ ohm-cm ($\Omega$-cm) @25° C., more preferably from about $10^2$ to $10^7$ ohm-cm ($\Omega$-cm) @25° C., and most preferably from about $10^4$ to $10^6$ ohm-cm ($\Omega$-cm) @25° C. The preferred range is determined by the fact that lower resistivity materials typically provide faster response times, whereas higher resistivity materials result in reduced optical loss due to the proximity of the bias electrode to the waveguide(s). The use of a higher resistivity bias electrode material may also reduce coupling with the RF signal, thus decreasing the net RF loss per unit length of the RF signal electrode. Each of the bias electrodes 970, 972, 974, 976 may be formed from the material used to form the bleed layer 560, or a different material. Conveniently, when bias electrodes 970, 972, 974, 976 and the bleed layer are fabricated from the same material (e.g., TaSiN), the fabrication process is relatively simple. The bias electrodes 970, 972, 974, 976 may be fabricated using one of various well-known methods, including deposition and sputtering. The thickness of the bias electrodes 970, 976 is typically in the range between about 0.05 and 0.5 μm, and more commonly between about 0.05 and 0.25 μm.

The lower buffer layer 980, 986 provides a spacer between the optical waveguides 526, 524 and the overlying cap sections of the bias signal electrodes 970, 976, respectively. Accordingly, the lower buffer layer 980, 986 is typically fabricated with a material that is optically transparent in the wavelength of interest (e.g., 1.55 microns). In one embodiment, the lower buffer layer 980, 986 is fabricated with a substantially non-conductive dielectric material, such as silicon dioxide ($SiO_2$) or benzocyclobutene (BCB). In another embodiment, the lower buffer layer 980, 986 is fabricated from a dielectric material, such as $SiO_2$, which has been sputtered such that it exhibits a small amount of intrinsic conductivity. In yet another embodiment, the lower buffer layer 980, 986 is fabricated with a dielectric material having small amount of conductivity, such as doped or ion implanted $SiO_2$. In general, the resistivity of the lower buffer layer will be in the range from about $10^{17}$-$10^{19} \Omega$-cm @25° C. The lower buffer layer 980, 986 is typically fabricated using one of various well-known methods, such vacuum deposition, ion-assist vacuum deposition, sputtering, or chemical vapor deposition (CVD). The thickness of the lower buffer layer 980, 986 is typically in the range between about 0.05 and 1 μm, and more commonly between about 0.1 and 0.5 μm. The lower buffer layer may require an annealing step after deposition if formed from $SiO_2$.

According to one embodiment of the instant invention, the electro-optic device 900 is fabricated by first depositing the lower buffer layer material, which is subsequently annealed and etched to form the lower buffer layer 980, 986, and secondly depositing the bias electrode material, which is subsequently etched to form the bias electrodes 970, 972, 974, 976. Notably, the lower buffer layer is only partially etched in the region directly over each waveguide 526, 524 such that the bias signal electrodes 970, 976 have substantially E-shaped cross section, wherein the middle arm of the E is shorter than the outer arms. According to other embodiments, the bias signal electrodes 970, 976 may provide a more conformal coating of the lower buffer layers 980, 986, respectively.

Advantageously, the upper layers 970b, 976b, which extend over waveguides 526, 524, respectively, significantly enhance the bias electrode structure modulation efficiency. The outer segments of the lower layers 970a, 976a not only contribute to the applied field, but also help to limit any horizontal ionic conduction in the buffer layers 980, 986, which would counteract the applied field from each bias signal electrode 970, 976. The center segments 970c, 976c of the lower portions 970a, 976a, respectively, advantageously help to focus the applied field, while minimizing increases in optical loss.

Figure 10:
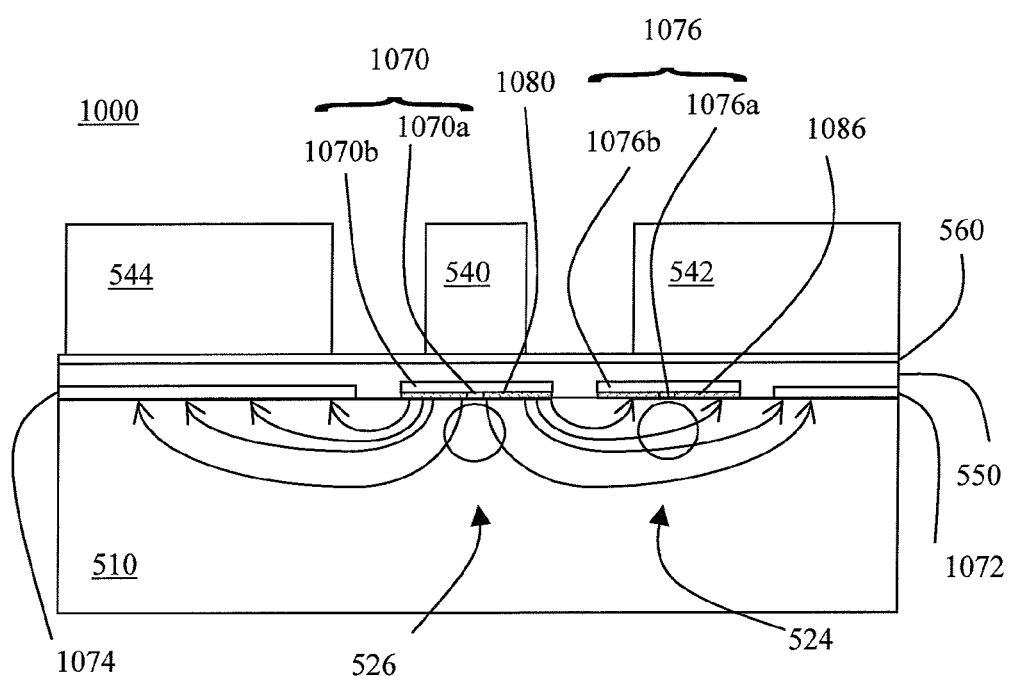
FIG. 10 is a sectional view of an electro-optic device in accordance with another embodiment of the instant invention having a patterned lower buffer layer.

Referring to FIG. 10, there is shown a sectional view of an electro-optic device in accordance with other embodiment of the instant invention. The electro-optic device 1000 includes a substrate 510, first 524 and second 526 optical waveguides, an RF signal electrode 540, RF ground electrodes 542, 544, an upper buffer layer 550, a bleed layer 560, first 1070 and second 1076 bias signal electrodes, bias ground electrodes 1072, 1074, and a lower buffer layer 1080, 1086.

The substrate 510, first 524 and second 526 optical waveguides, RF signal electrode 540, RF ground electrodes 542, 544, upper buffer layer 550, and bleed layer 560, are as described above.

The first bias signal electrode 1070, the second bias signal electrode 1076, the first bias ground electrode 1074, and the second bias ground electrode 1072, are all supported by the substrate 510. The bias electrodes 1070, 1072, 1074, 1076 are part of the bias electrode structure used to apply a low-frequency or DC voltage across the optical waveguides. Each of the first 1070 and second 1076 bias signal electrodes includes a lower portion and an upper cap section. Each lower portion 1070a, 1076a includes a center segment disposed directly on the substrate 510 that splits the lower buffer layer into two segments. The upper cap sections 1070b, 1076b extend over the split buffer layers 1080, 1086 and are in contact with the lower portions 1070a, 1076a, respectively.

Each of the bias electrodes 1070, 1072, 1074, 1076 is typically formed from a high-resistivity material, such as tantalum silicon nitride (TaSiN), amorphous silicon (Si), indium oxide ($In_2O_3$), tin oxide ($SnO_2$), zinc oxide (ZnO), etc. Using a high resistivity material allows the bias electrodes 1070, 1072, 1074, 1076 to be conductive at low frequencies and to function as a dielectric at high-frequencies. Accordingly, the bias electrodes are effectively transparent to the electric field generated by the RF electrodes. Suitable resistivity values for the bias electrode material lie between that of the RF electrode material and that of the substrate. For example, TaSiN typically has a resistivity in the range of about $10^4$ to $10^6 \Omega$-cm @25° C., which is between ~$2.3 \times 10^{-6} \Omega$-cm @25° C. (Au) and ~$1.3 \times 10^{17} \Omega$-cm @25° C. ($LiNbO_3$). Preferably, the resistivity of the bias electrode material is in the range from about 1 to $10^8$ ohm-cm ($\Omega$-cm) @25° C., more preferably from about $10^2$ to $10^7$ ohm-cm ($\Omega$-cm) @25° C., and most preferably from about $10^4$ to $10^6$ ohm-cm ($\Omega$-cm) @25° C. The preferred range is determined by the fact that lower resistivity materials typically provide faster response times, whereas higher resistivity materials result in reduced optical loss due to the proximity of the bias electrode to the waveguide(s). The use of a higher resistivity bias electrode material may also reduce coupling with the RF signal, thus decreasing the net RF loss per unit length of the RF signal electrode. Each of the bias electrodes 1070, 1072, 1074, 1076 may be formed from the material used to form the bleed layer 560, or a different material. Conveniently, when the bias electrodes 1070, 1072, 1074, 1076 and the bleed layer are fabricated from the same material (e.g., TaSiN), the fabrication process is relatively simple. The bias electrodes 1070, 1072, 1074, 1076 may be fabricated using one of various well-known methods, including deposition and sputtering. The thickness of the bias electrodes 1070, 1076 is typically in the range between about 0.05 and 0.5 µm, and more commonly between about 0.05 and 0.25 µm.

The lower buffer layer 1080, 1086 provides a spacer between the optical waveguides 526, 524 and the overlying upper cap sections 1070b, 1076b, respectively. Accordingly, the lower buffer layer 1080, 1086 is typically fabricated with a material that is optically transparent in the wavelength of interest (e.g., 1.55 microns). In one embodiment, the lower buffer layer 1080, 1086 is fabricated with a substantially non-conductive dielectric material, such as silicon dioxide ($SiO_2$) or benzocyclobutene (BCB). In another embodiment, the lower buffer layer 1080, 1086 is fabricated from a dielectric material, such as $SiO_2$, which has been sputtered such that it exhibits a small amount of intrinsic conductivity. In yet another embodiment, the lower buffer layer 1080, 1086 is fabricated with a dielectric material having small amount of conductivity, such as doped or ion implanted $SiO_2$. In general, the resistivity of the lower buffer layer will be in the range from about $10^{17}$-$10^{19}$ $\Omega$-cm @25° C. The lower buffer layer 1080, 1086 is typically fabricated using one of various well-known methods, such vacuum deposition, ion-assist vacuum deposition, sputtering, or chemical vapor deposition (CVD). The thickness of the lower buffer layer 1080, 1086 is typically in the range between about 0.05 and 1 µm, and more commonly between about 0.1 and 0.5 µm. The lower buffer layer may require an annealing step after deposition if formed from $SiO_2$.

According to one embodiment of the instant invention, the electro-optic device 1000 is fabricated by first depositing the lower buffer layer material, which is subsequently annealed and etched to form the lower split buffer layers 1080, 1086, and secondly depositing the bias electrode material, which is subsequently etched to form the bias electrodes 1070, 1072, 1074, 1076. In this embodiment, the bias signal electrodes 1070, 1076 have been shown having a substantially T-shaped cross section. In other embodiments, the bias signal electrodes 1070, 1076 may provide a more conformal coating of the lower buffer layers 1080, 1086, respectively.

Advantageously, the upper cap sections 1070b, 1076b, which extend over waveguides 526, 524, respectively, significantly enhance the bias electrode structure modulation efficiency.

Further advantageously, since the bias electrodes 1070, 1076 have a substantially T-shaped cross section rather than the E-shaped cross section illustrated in FIG. 8, optical loading from the outer segments is eliminated.

Figure 11:
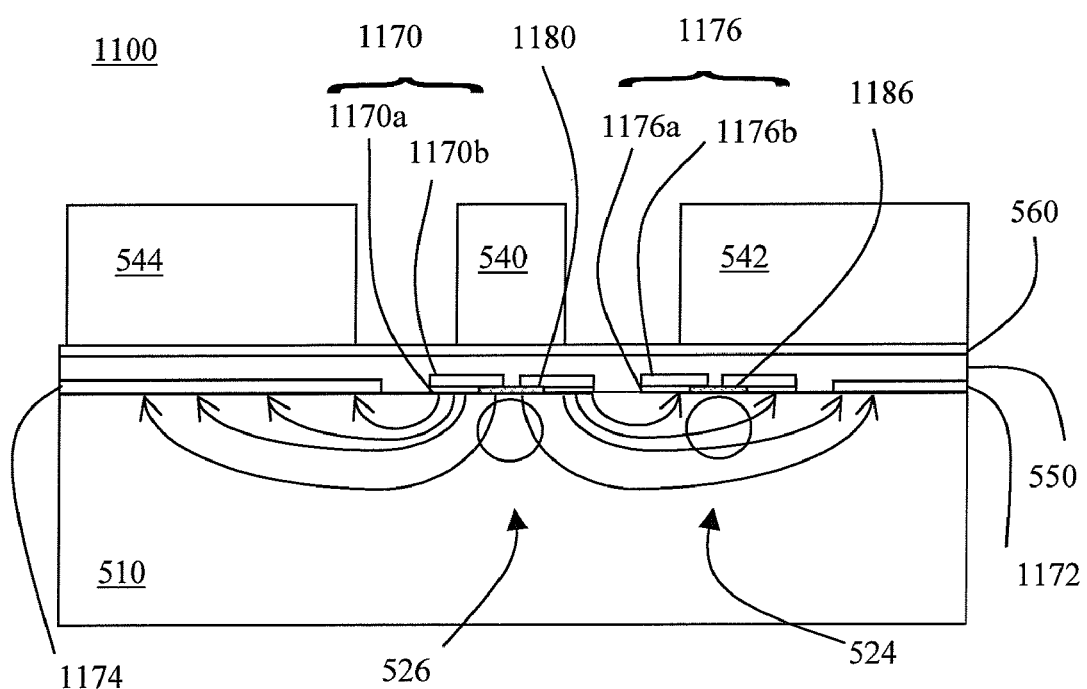
FIG. 11 is a sectional view of an electro-optic device in accordance with another embodiment of the instant invention having a patterned lower buffer layer.

Referring to FIG. 11, there is shown a sectional view of an electro-optic device in accordance with other embodiment of the instant invention. The electro-optic device 1100 includes a substrate 510, first 524 and second 526 optical waveguides, an RF signal electrode 540, RF ground electrodes 542, 544, an upper buffer layer 550, a bleed layer 560, first 1170 and second 1176 bias signal electrodes, bias ground electrodes 1172, 1174, and a lower buffer layer 1180, 1186.

The substrate 510, first 524 and second 526 optical waveguides, RF signal electrode 540, RF ground electrodes 542, 544, upper buffer layer 550, and bleed layer 560, are as described above.

The first bias signal electrode 1170, the second bias signal electrode 1176, the first bias ground electrode 1174, and the second bias ground electrode 1172, are all supported by the substrate 510. The bias electrodes 1170, 1172, 1174, 1176 are part of the bias electrode structure used to apply a low-frequency or DC voltage across the optical waveguides. Each of the first 1170 and second 1176 bias signal electrodes includes a lower split portion 1170a, 1176a and an upper split portion 1170b, 1176b, respectively. The upper split portions 1170b, 1176b at least partially extend over the buffer layers 1180, 1186, respectively.

Each of the bias electrodes 1170, 1172, 1174, 1176 is typically formed from a high-resistivity material, such as tantalum silicon nitride (TaSiN), amorphous silicon (Si), indium oxide ($In_2O_3$), tin oxide ($SnO_2$), zinc oxide (ZnO), etc. Using a high resistivity material allows the bias electrodes 1170, 1172, 1174, 1176 to be conductive at low frequencies and to function as a dielectric at high-frequencies. Accordingly, the bias electrodes are effectively transparent to the electric field generated by the RF electrodes. Suitable resistivity values for the bias electrode material lie between that of the RF electrode material and that of the substrate. For example, TaSiN typically has a resistivity in the range of about $10^4$ to $10^6$ $\Omega$-cm @25° C., which is between ~$2.3 \times 10^{-6}$ $\Omega$-cm @25° C. (Au) and ~$1.3 \times 10^{17}$ $\Omega$-cm @25° C. ($LiNbO_3$). Preferably, the resistivity of the bias electrode material is in the range from about 1 to $10^8$ ohm-cm ($\Omega$-cm) @25° C., more preferably from about $10^2$ to $10^7$ ohm-cm ($\Omega$-cm) @25° C., and most preferably from about $10^4$ to $10^6$ ohm-cm ($\Omega$-cm) @25° C. The preferred range is determined by the fact that lower resistivity materials typically provide faster response times, whereas higher resistivity materials result in reduced optical loss due to the proximity of the bias electrode to the waveguide(s). The use of a higher resistivity bias electrode material may also reduce coupling with the RF signal, thus decreasing the net RF loss per unit length of the RF signal electrode. Each of the bias electrodes 1170, 1172, 1174, 1176 may be formed from the material used to form the bleed layer 560, or a different material. Conveniently, when the bias electrodes 1170, 1172, 1174, 1176 and the bleed layer are fabricated from the same material (e.g., TaSiN), the fabrication process is relatively simple. The bias electrodes 1170, 1172, 1174, 1176 may be fabricated using one of various well-known methods, including deposition and sputtering. The thickness of the bias electrodes 1170, 1176 is typically in the range between about 0.05 and 0.5 µm, and more commonly between about 0.05 and 0.25 µm.

The lower buffer layer 1180, 1186 provides a spacer between the optical waveguides 526, 524 and the overlying upper split portions of the bias signal electrodes 1170, 1176, respectively. Accordingly, the lower buffer layer 1180, 1186 is typically fabricated with a material that is optically transparent in the wavelength of interest (e.g., 1.55 microns). In one embodiment, the lower buffer layer 1180, 1186 is fabricated with a substantially non-conductive dielectric material, such as silicon dioxide ($SiO_2$) or benzocyclobutene (BCB). In another embodiment, the lower buffer layer 1180, 1186 is fabricated from a dielectric material, such as $SiO_2$, which has been sputtered such that it exhibits a small amount of intrinsic conductivity. In yet another embodiment, the lower buffer layer 1180, 1186 is fabricated with a dielectric material having small amount of conductivity, such as doped or ion implanted $SiO_2$. In general, the resistivity of the lower buffer layer will be in the range from about $10^{17}$-$10^{19}$ Ω-cm @25° C. The lower buffer layer 1180, 1186 is typically fabricated using one of various well-known methods, such vacuum deposition, ion-assist vacuum deposition, sputtering, or chemical vapor deposition (CVD). The thickness of the lower buffer layer 1180, 1186 is typically in the range between about 0.05 and 1 μm, and more commonly between about 0.1 and 0.5 μm. The lower buffer layer may require an annealing step after deposition if formed from $SiO_2$.

According to one embodiment of the instant invention, the electro-optic device 1100 is fabricated by first depositing the lower buffer layer material, which is subsequently annealed and etched to form the lower buffer layer 1180, 1186, and secondly depositing the bias electrode material, which is subsequently etched to form the bias electrodes 1170, 1172, 1174, 1176.

Advantageously, the upper split portions 1170b, 1176b, which extend over waveguides 526, 524, respectively, significantly enhance the bias electrode structure modulation efficiency. The lower split portions 1170a, 1176a not only contribute to the applied field, but also help to limit any horizontal ionic conduction in the buffer layers 1180, 1186, which would counteract the applied field from each bias signal electrode 1170, 1176.

Further advantageously, the upper split portions 1170b, 1176b form a partial cap, thus reducing optical loss. In addition, the inner bottom corners of the split portions 1170b, 1176b can be used to focus the applied field onto the underlying waveguides 526, 524, respectively.

Figure 12:
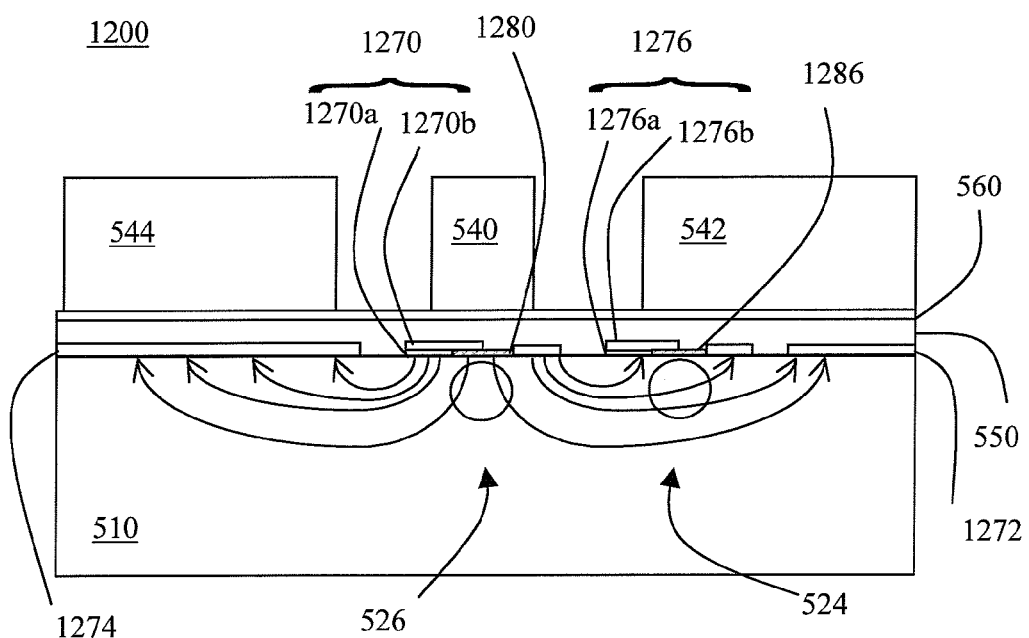
FIG. 12 is a sectional view of an electro-optic device in accordance with another embodiment of the instant invention having a patterned lower buffer layer.

Referring to FIG. 12, there is shown a sectional view of an electro-optic device in accordance with other embodiment of the instant invention. The electro-optic device 1200 includes a substrate 510, first 524 and second 526 optical waveguides, an RF signal electrode 540, RF ground electrodes 542, 544, an upper buffer layer 550, a bleed layer 560, first 1270 and second 1276 bias signal electrodes, bias ground electrodes 1272, 1274, and a lower buffer layer 1280, 1286.

The substrate 510, first 524 and second 526 optical waveguides, RF signal electrode 540, RF ground electrodes 542, 544, upper buffer layer 550, and bleed layer 560, are as described above.

The first bias signal electrode 1270, the second bias signal electrode 1276, the first bias ground electrode 1274, and the second bias ground electrode 1272, are all supported by the substrate 510. The bias electrodes 1270, 1272, 1274, 1276 are part of the bias electrode structure used to apply a low-frequency or DC voltage across the optical waveguides. Each of the first 1270 and second 1276 bias signal electrodes includes a lower split portion 1270a, 1276a and a partial cap portion 1270b, 1276b, respectively. The partial cap portions 1270b, 1276b at least partially extend over the buffer layers 1280, 1286, respectively.

Each of the bias electrodes 1270, 1272, 1274, 1276 is typically formed from a high-resistivity material, such as tantalum silicon nitride (TaSiN), amorphous silicon (Si), indium oxide ($In_2O_3$), tin oxide ($SnO_2$), zinc oxide (ZnO), etc. Using a high resistivity material allows the bias electrodes 1270, 1272, 1274, 1276 to be conductive at low frequencies and to function as a dielectric at high-frequencies. Accordingly, the bias electrodes are effectively transparent to the electric field generated by the RF electrodes. Suitable resistivity values for the bias electrode material lie between that of the RF electrode material and that of the substrate. For example, TaSiN typically has a resistivity in the range of about $10^4$ to $10^6$ Ω-cm @25° C., which is between ~$2.3 \times 10^{-6}$ Ω-cm @25° C. (Au) and ~$1.3 \times 10^{17}$ Ω-cm @25° C. ($LiNbO_3$). Preferably, the resistivity of the bias electrode material is in the range from about 1 to $10^8$ ohm-cm (Ω-cm) @25° C., more preferably from about $10^2$ to $10^7$ ohm-cm (Ω-cm) @25° C., and most preferably from about $10^4$ to $10^6$ ohm-cm (Ω-cm) @25° C. The preferred range is determined by the fact that lower resistivity materials typically provide faster response times, whereas higher resistivity materials result in reduced optical loss due to the proximity of the bias electrode to the waveguide(s). The use of a higher resistivity bias electrode material may also reduce coupling with the RF signal, thus decreasing the net RF loss per unit length of the RF signal electrode. Each of the bias electrodes 1270, 1272, 1274, 1276 may be formed from the material used to form the bleed layer 560, or a different material. Conveniently, when the bias electrodes 1270, 1272, 1274, 1276 and the bleed layer are fabricated from the same material (e.g., TaSiN), the fabrication process is relatively simple. The bias electrodes 1270, 1272, 1274, 1276 may be fabricated using one of various well-known methods, including deposition and sputtering. The thickness of the bias electrodes 1270, 1276 is typically in the range between about 0.05 and 0.5 μm, and more commonly between about 0.05 and 0.25 μm.

The lower buffer layer 1280, 1286 provides a spacer between the optical waveguides 526, 524 and the overlying partial cap sections of the bias signal electrodes 1270, 1276, respectively. Accordingly, the lower buffer layer 1280, 1286 is typically fabricated with a material that is optically transparent in the wavelength of interest (e.g., 1.55 microns). In one embodiment, the lower buffer layer 1280, 1286 is fabricated with a substantially non-conductive dielectric material, such as silicon dioxide ($SiO_2$) or benzocyclobutene (BCB). In another embodiment, the lower buffer layer 1280, 1286 is fabricated from a dielectric material, such as $SiO_2$, which has been sputtered such that it exhibits a small amount of intrinsic conductivity. In yet another embodiment, the lower buffer layer 1280, 1286 is fabricated with a dielectric material having small amount of conductivity, such as doped or ion implanted $SiO_2$. In general, the resistivity of the lower buffer layer will be in the range from about $10^{17}$-$10^{19}$ Ω-cm @25° C. The lower buffer layer 1280, 1286 is typically fabricated using one of various well-known methods, such vacuum deposition, ion-assist vacuum deposition, sputtering, or chemical vapor deposition (CVD). The thickness of the lower buffer layer 1280, 1286 is typically in the range between about 0.05 and 1 μm, and more commonly between about 0.1 and 0.5 μm. The lower buffer layer may require an annealing step after deposition if formed from $SiO_2$.

According to one embodiment of the instant invention, the electro-optic device 1200 is fabricated by first depositing the lower buffer layer material, which is subsequently annealed and etched to form the lower buffer layer 1280, 1286, and secondly depositing the bias electrode material, which is subsequently etched to form the bias electrodes 1270, 1272, 1274, 1276.

Advantageously, the partial cap portions 1270b, 1276b, which extend over waveguides 526, 524, respectively, significantly enhance the bias electrode structure modulation efficiency. The lower split portions 1270a, 1276a not only contribute to the applied field, but also help to limit any horizontal ionic conduction in the buffer layers 1280, 1286, which would counteract the applied field from each bias signal electrode 1270, 1276.

Further advantageously, since the partial cap portions 1270b, 1276b do not extend fully over the waveguides 526, 524, respectively, optical loss is reduced. In addition, the inner bottom corners of the partial caps portions 1270b, 1276b can be used to focus the applied field onto the underlying waveguides 526, 524, respectively.

Figure 13:
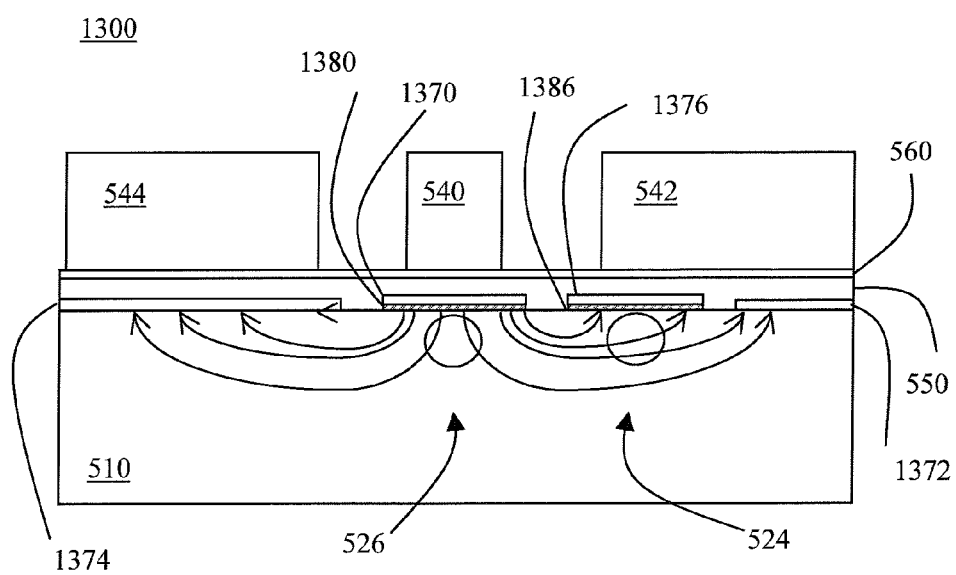
FIG. 13 is a sectional view of an electro-optic device in accordance with another embodiment of the instant invention having a patterned lower buffer layer.

Referring to FIG. 13, there is shown a sectional view of an electro-optic device in accordance with other embodiment of the instant invention. The electro-optic device 1300 includes a substrate 510, first 524 and second 526 optical waveguides, an RF signal electrode 540, RF ground electrodes 542, 544, an upper buffer layer 550, a bleed layer 560, first 1370 and second 1376 bias signal electrodes, bias ground electrodes 1372, 1374, and a lower buffer layer 1380, 1386.

The substrate 510, first 524 and second 526 optical waveguides, RF signal electrode 540, RF ground electrodes 542, 544, upper buffer layer 550, and bleed layer 560, are as described above.

The first bias signal electrode 1370, the second bias signal electrode 1376, the first bias ground electrode 1374, and the second bias ground electrode 1372, are all supported by the substrate 510. The bias electrodes 1370, 1372, 1374, 1376 are part of the bias electrode structure used to apply a low-frequency or DC voltage across the optical waveguides. The bias signal electrodes 1370, 1376 extend over the first 1380 and second 1386 regions of the buffer layer, respectively.

Each of the bias electrodes 1370, 1372, 1374, 1376 is typically formed from a high-resistivity material, such as tantalum silicon nitride (TaSiN), amorphous silicon (Si), indium oxide ($In_2O_3$), tin oxide ($SnO_2$), zinc oxide (ZnO), etc. Using a high resistivity material allows the bias electrodes 1370, 1372, 1374, 1376 to be conductive at low frequencies and to function as a dielectric at high-frequencies. Accordingly, the bias electrodes are effectively transparent to the electric field generated by the RF electrodes. Suitable resistivity values for the bias electrode material lie between that of the RF electrode material and that of the substrate. For example, TaSiN typically has a resistivity in the range of about $10^4$ to $10^6 \Omega$-cm @25° C., which is between ~$2.3 \times 10^{-6}$ $\Omega$-cm @25° C. (Au) and $1.3 \times 10^f \Omega$-cm @25° C. ($LiNbO_3$). Preferably, the resistivity of the bias electrode material is in the range from about 1 to $10^8$ ohm-cm ($\Omega$-cm) @25° C., more preferably from about $10^2$ to $10^7$ ohm-cm ($\Omega$-cm) @25° C., and most preferably from about $10^4$ to $10^6$ ohm-cm ($\Omega$-cm) @25° C. The preferred range is determined by the fact that lower resistivity materials typically provide faster response times, whereas higher resistivity materials result in reduced optical loss due to the proximity of the bias electrode to the waveguide(s). The use of a higher resistivity bias electrode material may also reduce coupling with the RF signal, thus decreasing the net RF loss per unit length of the RF signal electrode. Each of the bias electrodes 1370, 1372, 1374, 1376 may be formed from the material used to form the bleed layer 560, or a different material. Conveniently, when the bias electrodes 1370, 1372, 1374, 1376 and the bleed layer are fabricated from the same material (e.g., TaSiN), the fabrication process is relatively simple. The bias electrodes 1370, 1372, 1374, 1376 may be fabricated using one of various well-known methods, including deposition and sputtering. The thickness of the bias electrodes 1370, 1376 is typically in the range between about 0.05 and 0.5 µm, and more commonly between about 0.05 and 0.25 µm.

The lower buffer layer 1380, 1386 provides a spacer between the optical waveguides 526, 524 and the overlying bias signal electrodes 1370, 1376, respectively. Accordingly, the lower buffer layer 1380, 1386 is typically fabricated with a material that is optically transparent in the wavelength of interest (e.g., 1.55 microns). Since the bias signal electrodes 1370, 1376 are not in direct contact with the substrate 510, it is preferred that the lower buffer layer 1380, 1386 be fabricated from a material having at least some conductivity. For example, in one embodiment the lower buffer layer 1380, 1386 is fabricated from a dielectric material, such as $SiO_2$, which has been sputtered such that it exhibits a small amount of intrinsic conductivity, or which has been doped or ion implanted to provide increased conductivity. In general, the resistivity of the lower buffer layer 1380, 1386 will be in the range from about $10^{17}$-$10^{19} \Omega$-cm @25° C. The lower buffer layer 1380, 1386 is typically fabricated using one of various well-known methods, such vacuum deposition, ion-assist vacuum deposition, sputtering, or chemical vapor deposition (CVD). The thickness of the lower buffer layer 1380, 1386 is typically in the range between about 0.05 and 1 µm, and more commonly between about 0.1 and 0.5 µm. The lower buffer layer may require an annealing step after deposition if formed from $SiO_2$.

According to one embodiment of the instant invention, the electro-optic device 1300 is fabricated by first depositing the lower buffer layer material, which is subsequently annealed and etched to form the lower buffer layer 1380, 1386, and secondly depositing the bias electrode material, which is subsequently etched to form the bias electrodes 1370, 1372, 1374, 1376.

Advantageously, the lower buffer layer 1380, 1386 significantly reduces optical loss in the waveguides 526, 524 resulting from the overlying bias signal electrodes 1370, 1376.

Figure 4A:
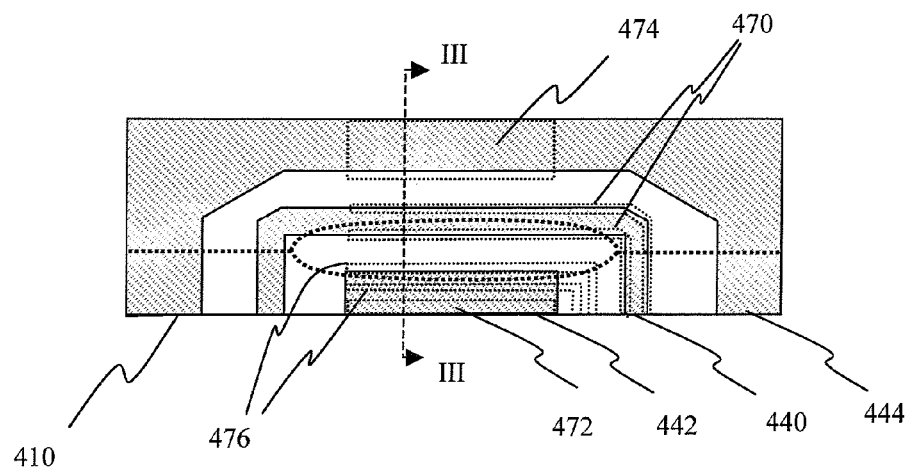
FIG. 4a is a plan view of a prior art low bias drift Mach-Zehnder optical modulator having a Z-cut LiNbO$_3$ substrate.
Figure 4B:
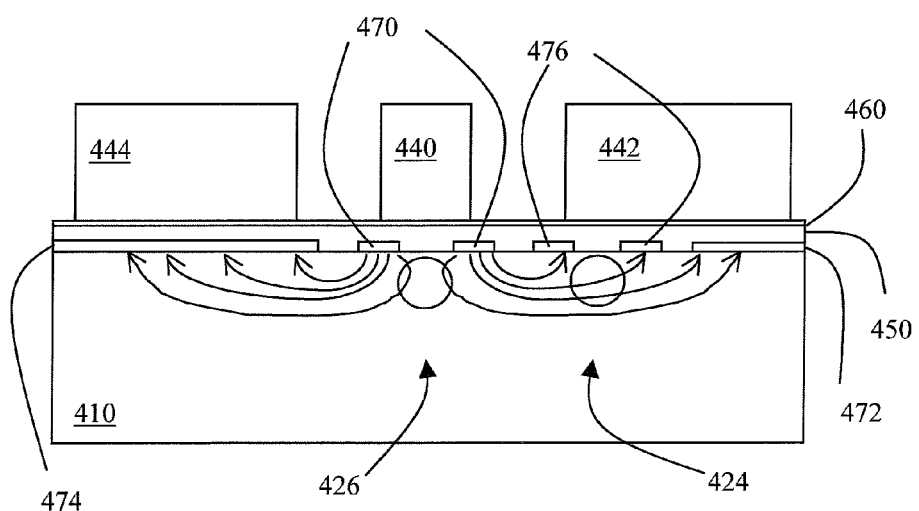
FIG. 4b is a sectional view of the prior art Mach-Zehnder optical modulator illustrated in FIG. 4a taken along line III-III.

Further advantageously, the non-split bias signal electrodes illustrated in FIG. 13 are less complicated to fabricate than the split bias signal electrodes illustrated in FIGS. 4, 11, and 12. Further advantageously, the non-split bias electrodes illustrated in FIG. 13 impart more uniform mechanical stress on the optical waveguides underneath them, and therefore less differential mechanical stress that changes with temperature, resulting in less sensitivity of relative optical phase in the two waveguides to temperature. Changes in relative optical phase result in undesirable shifts in the bias point of an MZ.

Figure 14:
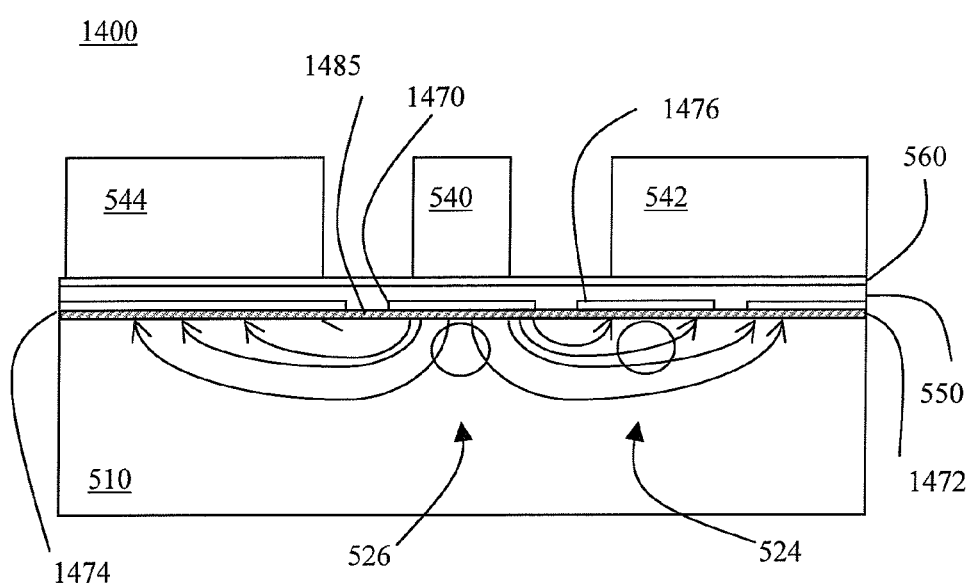
FIG. 14 is a sectional view of an electro-optic device in accordance with another embodiment of the instant invention having a planarized lower buffer layer.

Referring to FIG. 14, there is shown a sectional view of an electro-optic device in accordance with other embodiment of the instant invention. The electro-optic device 1400 includes a substrate 510, first 524 and second 526 optical waveguides, an RF signal electrode 540, RF ground electrodes 542, 544, an upper buffer layer 550, a bleed layer 560, first 1470 and second 1476 bias signal electrodes, bias ground electrodes 1472, 1474, and a lower buffer layer 1485.

The substrate 510, first 524 and second 526 optical waveguides, RF signal electrode 540, RF ground electrodes 542, 544, upper buffer layer 550, and bleed layer 560, are as described above.

The first bias signal electrode 1470, the second bias signal electrode 1476, the first bias ground electrode 1474, and the second bias ground electrode 1472, are all supported by the substrate 510. The bias electrodes 1470, 1472, 1474, 1476 are part of the bias electrode structure used to apply a low-frequency or DC voltage across the optical waveguides. Each bias signal electrode 1470, 1476 extends over the buffer layer 1485.

Each of the bias electrodes 1470, 1472, 1474, 1476 is typically formed from a high-resistivity material, such as tantalum silicon nitride (TaSiN), amorphous silicon (Si), indium oxide ($In_2O_3$), tin oxide ($SnO_2$), zinc oxide (ZnO), etc. Using a high resistivity material allows the bias electrodes 1470, 1472, 1474, 1476 to be conductive at low frequencies and to function as a dielectric at high-frequencies. Accordingly, the bias electrodes are effectively transparent to the electric field generated by the RF electrodes. Suitable resistivity values for the bias electrode material lie between that of the RF electrode material and that of the substrate. For example, TaSiN typically has a resistivity in the range of about $10^4$ to $10^6$ Ω-cm @25° C., which is between ~2.3×10$^{-6}$ Ω-cm @25° C. (Au) and ~1.3×10$^{17}$ Ω-cm @25° C. (LiNbO$_3$). Preferably, the resistivity of the bias electrode material is in the range from about 1 to $10^8$ ohm-cm (Ω-cm) @25° C., more preferably from about $10^2$ to $10^7$ ohm-cm (Ω-cm) @25° C., and most preferably from about $10^4$ to $10^6$ ohm-cm (Ω-cm) @25° C. The preferred range is determined by the fact that lower resistivity materials typically provide faster response times, whereas higher resistivity materials result in reduced optical loss due to the proximity of the bias electrode to the waveguide(s). The use of a higher resistivity bias electrode material may also reduce coupling with the RF signal, thus decreasing the net RF loss per unit length of the RF signal electrode. Each of the bias electrodes 1470, 1472, 1474, 1476 may be formed from the material used to form the bleed layer 560, or a different material. Conveniently, when the bias electrodes 1470, 1472, 1474, 1476 and the bleed layer are fabricated from the same material (e.g., TaSiN), the fabrication process is relatively simple. The bias electrodes 1470, 1472, 1474, 1476 may be fabricated using one of various well-known methods, including deposition and sputtering. The thickness of the bias electrodes 1470, 1476 is typically in the range between about 0.05 and 0.5 µm, and more commonly between about 0.05 and 0.25 µm.

The lower buffer layer 1485 provides a spacer between the optical waveguides 526, 524 and the overlying bias signal electrodes 1470, 1476, respectively. Accordingly, the lower buffer layer 1485 is typically fabricated with a material that is optically transparent in the wavelength of interest (e.g., 1.55 microns). Since the bias signal electrodes 1470, 1476 are not in direct contact with the substrate 510, it is preferred that the lower buffer layer 1485 be fabricated from a material having at least some conductivity. For example, in one embodiment the lower buffer layer 1485 is fabricated from a dielectric material, such as SiO$_2$, which has been sputtered such that it exhibits a small amount of intrinsic conductivity, or which has been doped or ion implanted to provide increased conductivity. In general, the resistivity of the lower buffer layer 1485 will be in the range from about $10^{17}$-$10^{19}$ Ω-cm @25° C. The lower buffer layer 1485 is typically fabricated using one of various well-known methods, such vacuum deposition, ion-assist vacuum deposition, sputtering, or chemical vapor deposition (CVD). The thickness of the lower buffer layer 1485 is typically in the range between about 0.05 and 1 µm, and more commonly between about 0.1 and 0.5 µm.

According to one embodiment of the instant invention, the electro-optic device 1400 is fabricated by first depositing the planarized lower buffer layer 1485, and secondly depositing the bias electrode material, which is subsequently etched to form the bias electrodes 1470, 1472, 1474, 1476. A lift-off process may also be used to pattern the bias electrodes.

Advantageously, the lower buffer layer 1485 significantly reduces optical loss in the waveguides 526, 524 resulting from the overlying bias signal electrodes 1470, 1476, respectively.

Further advantageously, the non-split bias signal electrodes illustrated in FIG. 14 are less complicated to fabricate than the split bias signal electrodes illustrated in FIGS. 4, 11, and 12. In addition, since the lower buffer layer 1485 does not need to be patterned like the lower buffer layer described with regards to FIGS. 5*a*, 6, 7, 8, 9, 10, 11, 12, and 13, the electro-optic device 1400 is simpler to fabricate. Further advantageously, the non-split bias electrodes illustrated in FIG. 14 impart more uniform mechanical stress on the optical waveguides underneath them, and therefore less differential mechanical stress that changes with temperature, resulting in less sensitivity of relative optical phase in the two waveguides to temperature. Changes in relative optical phase result in undesirable shifts in the bias point of an MZ.

Figure 15:
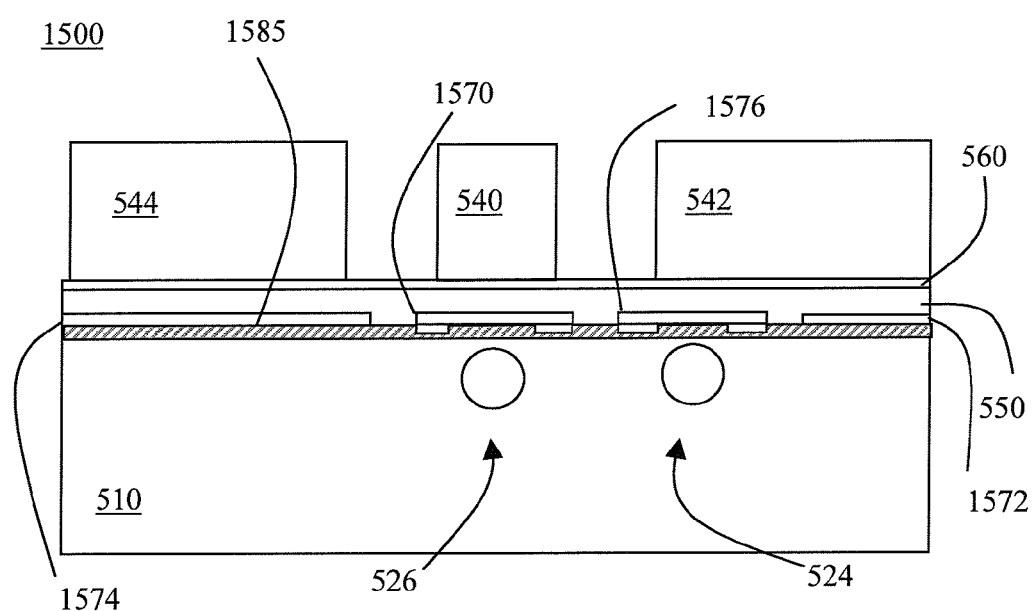
FIG. 15 is a sectional view of an electro-optic device in accordance with another embodiment of the instant invention having a planarized lower buffer layer.

Notably, a planarized lower buffer layer (e.g., like 1485) could be included in any of the embodiments described with regard to FIGS. 5*a*, 6, 7, 8, 9, 10, 11, 12, and 13. In particular, any of the bias signal electrodes disclosed in these embodiments could be deposited on a planarized buffer layer deposited on the substrate rather than directly on the substrate. For example, consider the embodiment illustrated in FIG. 15, which is similar to the embodiment described with regard to FIG. 5*a*.

The electro-optic device 1500 includes a substrate 510, first 524 and second 526 optical waveguides, an RF signal electrode 540, RF ground electrodes 542, 544, an upper buffer layer 550, a bleed layer 560, first 1570 and second 1576 bias signal electrodes, bias ground electrodes 1572, 1574, and a lower buffer layer 1585.

The substrate 510, first 524 and second 526 optical waveguides, RF signal electrode 540, RF ground electrodes 542, 544, upper buffer layer 550, and bleed layer 560, are as described above.

The first bias signal electrode 1570, the second bias signal electrode 1576, the first bias ground electrode 1574, and the second bias ground electrode 1572, are all supported by the substrate 510. The bias electrodes 1570, 1572, 1574, 1576 are part of the bias electrode structure used to apply a low-frequency or DC voltage across the optical waveguides. Each of the first 1570 and second 1576 bias signal electrodes includes a lower split portion and an upper cap section, which bridges the corresponding lower split portion.

Each of the bias electrodes 1570, 1572, 1574, 1576 is typically formed from a high-resistivity material, such as tantalum silicon nitride (TaSiN), amorphous silicon (Si), indium oxide (In$_2$O$_3$), tin oxide (SnO$_2$), zinc oxide (ZnO), etc. Using a high resistivity material allows the bias electrodes 1570, 1572, 1574, 1576 to be conductive at low frequencies and to function as a dielectric at high-frequencies. Accordingly, the bias electrodes are effectively transparent to the electric field generated by the RF electrodes. Suitable resistivity values for the bias electrode material lie between that of the RF electrode material and that of the substrate. For example, TaSiN typically has a resistivity in the range of about $10^4$ to $10^6$ Ω-cm @25° C., which is between ~2.3×10$^{-6}$ Ω-cm @25° C. (Au) and ~1.3×10$^{17}$ Ω-cm @25° C. (LiNbO$_3$). Preferably, the resistivity of the bias electrode material is in the range from about 1 to $10^8$ ohm-cm (Ω-cm) @25° C., more preferably from about $10^2$ to $10^7$ ohm-cm (Ω-cm) @25° C., and most preferably from about $10^4$ to $10^6$ ohm-cm (Ω-cm) @25° C. The preferred range is determined by the fact that lower resistivity materials typically provide faster response times, whereas higher resistivity materials result in reduced optical loss due to the proximity of the bias electrode to the waveguide(s). The use of a higher resistivity bias electrode material may also reduce coupling with the RF signal, thus decreasing the net RF loss per unit length of the RF signal electrode. Each of the bias electrodes 1570, 1572, 1574, 1576 may be formed from the material used to form the bleed layer 560, or a different material. Conveniently, when bias electrodes 1570, 1572, 1574, 1576 and the bleed layer are fabricated from the same material (e.g., TaSiN), the fabrication process is relatively simple. The bias electrodes 1570, 1572, 1574, 1576 may be fabricated using one of various well-known methods, including deposition and sputtering. The thickness of the bias electrodes 1570, 1576 is typically in the range between about 0.05 and 0.5 µm, and more commonly between about 0.05 and 0.25 µm.

The lower buffer layer 1585 provides a spacer between the optical waveguides 526, 524 and the overlying capping sections of the bias signal electrodes 1570, 1576, respectively. Accordingly, the lower buffer layer 1585 is typically fabricated with a material that is optically transparent in the wavelength of interest (e.g., 1.55 microns). Since the bias signal electrodes 1570, 1576 are not in direct contact with the substrate 510, it is preferred that the lower buffer layer 1585 be fabricated from a material having at least some conductivity. For example, in one embodiment the lower buffer layer 1585 is fabricated with a dielectric material, such as silicon dioxide ($SiO_2$), which has been sputtered such that it exhibits a small amount of intrinsic conductivity, or that has been doped/ion-implanted such that it exhibits increased conductivity. In general, the resistivity of the lower buffer layer 1585 will be in the range from about $10^{17}$-$10^{19}$ Ω-cm @25° C. The lower buffer layer 1585 is typically fabricated using one of various well-known methods, such vacuum deposition, ion-assist vacuum deposition, sputtering, or chemical vapor deposition (CVD). The thickness of the lower buffer layer 1585 is typically in the range between about 0.05 and 1 μm, and more commonly between about 0.1 and 0.5 μm.

According to one embodiment of the instant invention, the electro-optic device 1500 is fabricated by depositing the planarized lower buffer layer 1585 on the substrate 510, etching the lower buffer layer 1585 (e.g., half way down) to provide slots for accommodating the lower split portions of the bias signal electrodes 1570, 1576, depositing the bias electrode material, and etching the bias electrodes material to form bias electrodes 1570, 1572, 1574, 1576. The bias electrodes 1570 and 1576 may be of nearly constant thickness, being more conformal to the shape of lower buffer layer 1585.

Advantageously, this fabrication method allows the lower portions of the bias electrode to be fabricated relatively consistently. For example, alignment errors in etching the bias electrode material will not result in unequal widths of the lower portions.

In each of the embodiments described with regard to FIGS. 5a, 6, 7, 8, 9, 10, 11, 12, 13, 14, and 15, the electro-optic device includes a bias electrode disposed substantially over a waveguide, with an intervening lower buffer layer. Notably, this is in contrast to the embodiments described in US Patent Application Publication No. 2006/0023288 and U.S. Pat. No. 7,127,128, wherein bias electrodes are shifted laterally with respect to the waveguides, and wherein the buffer layer below the bias signal electrodes are eliminated to reduce DC drift and improve bias electrode modulation efficiency.

In each of the above-described embodiments, the lower buffer layer significantly reduces optical loss in the waveguides 526, 524 resulting from the overlying bias signal electrodes. For example in the absence of a lower buffer layer, a high resistivity bias electrode material, such as TaSiN, deposited directly over a waveguide in a Z-cut $LiNbO_3$ optical modulator will result in optical loss of about 1 to 2 dB/mm, which translates to 30 to 60 dB for a 30 mm electrode. With a 0.3 μm thick lower buffer layer, the optical loss drops substantially, becoming nearly negligible compared to other optical loss mechanisms in the device.

In each of the above-described embodiments, the bias electrode modulation efficiency will be at least partially dependent on the thickness of each lower buffer layer and its conductivity. For example, a thinner lower buffer layer will provide increased modulation efficiency, but at the cost of increased optical loss.

Improvement in the performance of the electro-optical devices described with regard to FIGS. 5a, 6, 7, 8, 9, 10, 11, 12, 13, 14, and 15 may be achieved by appropriate design of the bias electrode structure.

Figure 16:
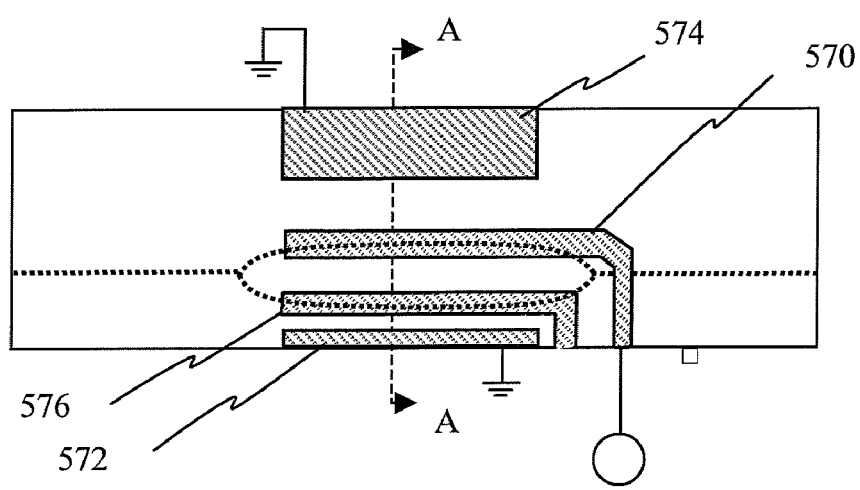
FIG. 16 is a plan view illustrating an embodiment where the bias electrode structure is substantially aligned with the RF electrode structure (not shown)
Figure 17A:
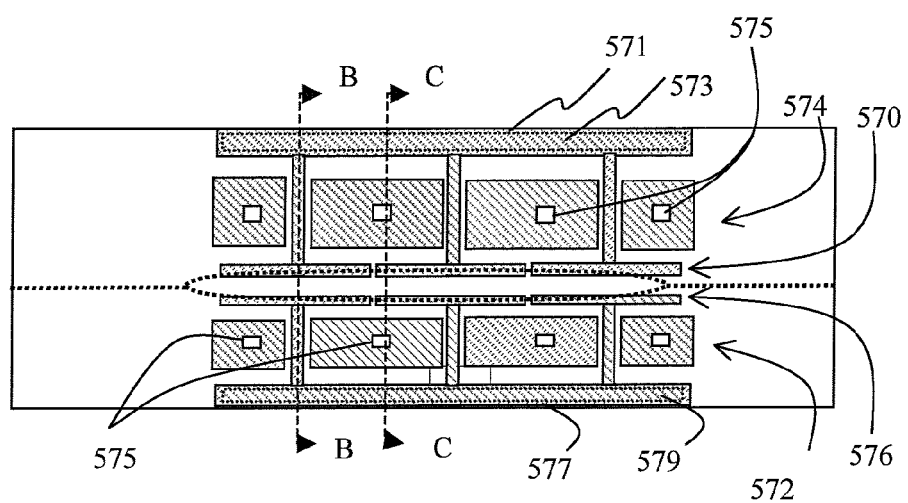
FIG. 17a is a plan view illustrating an embodiment where the bias electrode structure is segmented.

FIGS. 16, 17a,b,c, 18, and 19 illustrate some possible bias electrode structure designs. For illustrative purposes the embodiments in FIGS. 16 and 17a,b,c are described using the electro-optic device 500 discussed with reference to FIG. 5a, wherein the waveguides 524, 526 are patterned to form a Mach-Zehnder interferometer. Of course those skilled in the art, will be able to adapt these bias electrode structure designs to other embodiments of the instant invention. To simplify the drawings, the RF electrode structure 540, 542, 544 has been omitted from the plan views.

Referring to FIG. 16, there is shown an embodiment wherein the bias electrode structure 570, 572, 574, 576 substantially shadows the RF electrode structure (not shown). For example, each of the bias signal electrodes 570, 576 includes an elongated lower split portion, which is capped with an elongated upper cap section, both of which run under the RF electrode structure for the length of the parallel sections of the interferometer arms (i.e., the interaction distance). The ground electrodes 572, 574 are provided with ground potential. The bias signal electrode 570 is coupled to a low frequency or DC power source that provides the bias voltage (e.g., +5V). Optionally, the other bias signal electrode 576 is also coupled to a low frequency or DC power source (not shown) that provides another bias voltage (e.g., −5V). In this embodiment, the sectional view along line A-A corresponds to the sectional view provided in FIG. 5a.

Referring now to FIG. 17a, there is shown an embodiment wherein the bias ground electrodes 574, 572 and bias signal electrodes 570, 576 are segmented to suppress propagation of the RF signal along their length and reduce accumulated mechanical stress along their length. More specifically, the bias electrode material is patterned such that the segmented bias signal electrodes 570, 576 are coupled to outer bias signal electrodes 571, 577 with feed lines that extend between the bias ground electrode segments 574, 572. In general, the outer bias signal electrodes 571, 577 are fabricated with a relatively low series resistance to compensate for the high series resistance introduced by the narrow segmented bias electrodes 570, 576, respectively. In particular, the low series resistance provides the means for the bias signal voltage to be applied to the bias signal electrodes 570, 576 with minimal voltage drop. In one embodiment, the series resistance is reduced by providing wide outer bias signal electrodes 571, 577. In another embodiment, the series resistance is reduced by providing a thin metal film 573, 579, such as Cr, Ni/Cr (Nickel/Chromium), Ti/W and/or Au, on top of each outer bias signal electrode 571, 577, respectively.

As discussed above, the segmented bias signal electrodes 570, 576 are coupled to the outer bias electrodes 571, 577, respectively, at multiple feed points. For illustrative purposes, 3 feed points per bias signal electrode are shown. In other embodiments, feed points are provided every 0.25 to 5 mm. The feed points may be at regular intervals or may vary over the length of the waveguides. For example, with regard to the latter, the spacing between feed points may vary incrementally (i.e., such that each successive spacing differs) or may vary step-wise (i.e., such that at least some successive spacings are the same). Varying the spacing allows the frequency response of the bias electrodes to be tailored. For example, a design with multiple spacings results in multiple time constants of arbitrary amplitude to define the time domain response of the bias electrode. The time domain response of the bias electrode could be tailored to compensate for other relaxation effects occurring in the bulk or near surface of the substrate.

Figure 17B:
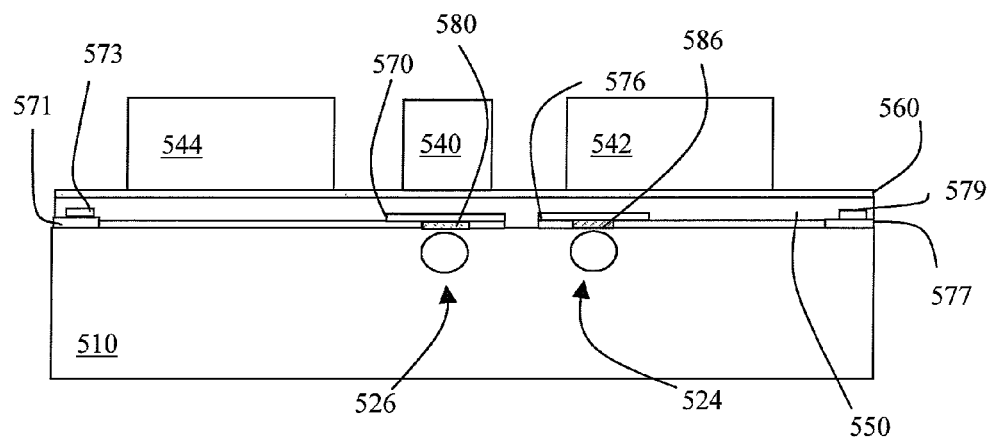
FIG. 17*b* is a sectional view of the embodiment illustrated in FIG. 17*a* taken along line B-B.

As illustrated in FIG. 17b, which is a sectional view along line B-B, the feed lines coupling the segmented bias signal electrodes 570, 576 to the outer bias signal electrodes 571, 577, respectively, are at the same level as the lower split portions. In this embodiment, the fabrication of the electro-optic device is similar to the process described above for fabricating electro-optic device 500.

Figure 17C:
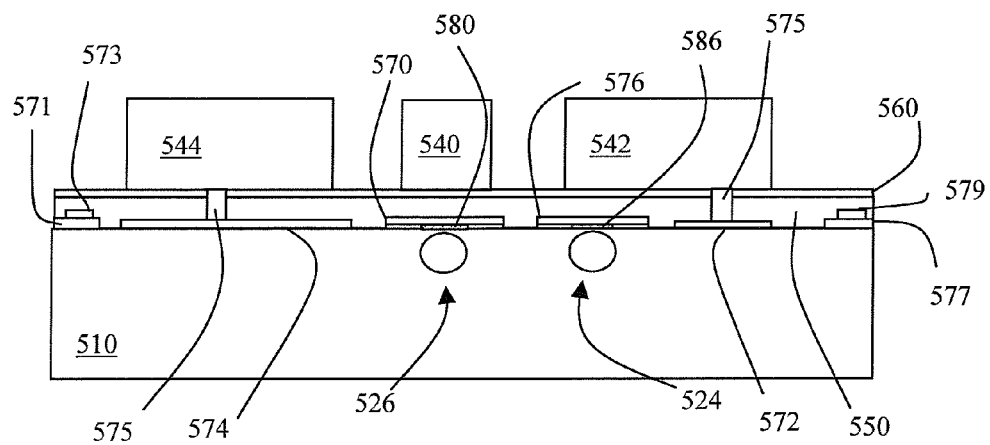
FIG. 17*c* is a sectional view of the embodiment illustrated in FIG. 17*a* taken along line C-C.

As illustrated in FIG. 17c, which is a sectional view along line C-C, each segmented bias ground electrode 574, 572 is electrically coupled to the overlying RF ground electrodes 542, 544 through a via 575 (e.g., a Au via formed by etching the bleed and buffer layers).

The RF ground electrodes 542, 544, and thus bias ground electrodes 572, 574, are provided with a ground potential. The outer bias electrode 571 is coupled to a low frequency or DC power source that provides the bias voltage (e.g., +5V). Optionally, the other outer bias signal electrode 577 is also coupled to a low frequency or DC power source (not shown) that provides another bias voltage having the opposite sign (e.g., −5V).

Figure 18:
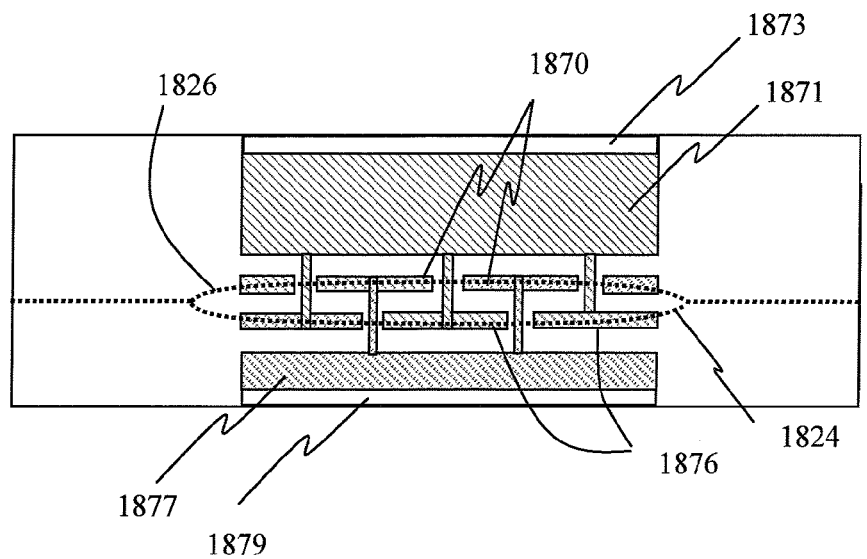
FIG. 18 is a plan view illustrating another embodiment where the bias electrode structure is segmented.

Referring to FIG. 18, there is shown another embodiment having bias electrodes that are segmented to suppress propagation of the RF signal along their length and reduce accumulated mechanical stress along their length. In this embodiment, the bias electrode material is patterned such that each segmented bias signal electrode 1870, 1876 is coupled to an outer bias signal electrode 1877, 1871, with feed lines that extend between segments of the other bias signal electrode 1876, 1870, respectively. More specifically, feed lines couple the segmented bias signal electrodes 1870 for the first waveguide 1826 to outer bias electrode 1877, and couple the segmented bias signal electrodes 1876 for the second waveguide 1824 to outer bias electrode 1871. As a result, the outer bias electrode 1871 functions as the ground electrode for the segmented bias electrodes 1870, whereas the outer bias electrode 1877 functions as the ground electrode for the segmented bias electrodes 1876. The outer bias electrode 1871 is coupled to a low frequency or DC power source that provides a first bias voltage (e.g., −5V), while the other outer bias signal electrode 1877 is coupled to a low frequency or DC power source (not shown) that provides a second bias voltage (e.g., +5V). Advantageously, this push-pull arrangement maximizes the modulation efficiency of the segmented bias electrodes.

In general, the outer bias signal electrodes 1871, 1877 are fabricated with a relatively low series resistance to compensate for the high series resistance introduced by the narrow segmented bias electrodes 1876, 1870, respectively. In particular, the low series resistance provides the means for the bias signal voltages to be applied to the bias signal electrodes 1870, 1876 with minimal voltage drop. In one embodiment, the series resistance is reduced by providing wide outer bias signal electrodes 1871, 1877. In another embodiment, the series resistance is reduced by providing a thin metal film 1873, 1879, such as Cr, Ni/Cr, Ti/W and/or Au, on top of each outer bias signal electrode 1871, 1877, respectively.

As discussed above, the segmented bias signal electrodes 1870, 1876 are coupled to the outer bias electrodes 1877, 1871, respectively, at multiple feed points. For illustrative purposes, 2-3 feed points per bias signal electrode are shown. In other embodiments, feed points are provided every 0.25 to 5 mm. The feed points may be at regular intervals or may vary over the length of the waveguides. For example, with regard to the latter, the spacing between feed points may vary incrementally (i.e., such that each successive spacing differs) or may vary step-wise (i.e., such that at least some successive spacings are the same).

The segmented bias signal electrodes 1870, 1876 may have a substantially bracket-shaped, U-shaped, T-shaped, E-shaped, or other-shaped cross section. If the cross-section is substantially bracket-shaped, then the bias electrode material may be patterned such that the feed lines connecting the segmented bias signal electrodes 1870, 1876 to the outer bias signal electrodes 1877, 1871, respectively, are at the same level as the lower split portions (e.g., analogous to fabrication method described for the embodiment illustrated in FIGS. 17a,b,c). Alternatively, the bias electrode material may be patterned such that the feed lines connecting the segmented bias signal electrodes 1870, 1876 to the outer bias signal electrodes 1877, 1871, respectively, are at the same level as at the cap sections. In this instance, the fabrication of the electro-optic device is similar to the process described above for fabricating electro-optic device 1500. Further alternatively, the bias electrode material may be patterned such that the feed lines connecting the segmented bias signal electrodes 1870, 1876 to the outer bias signal electrodes 1877, 1871, respectively, are part of an intermediate high resistivity layer that is disposed above the cap sections. In this instance, the segmented bias signal electrodes 1870, 1876 may be periodically connected to the intermediate high resistivity layer with high resistivity vias, as discussed in FIGS. 12a and 15a of US Patent Application Publication No. 2006/0023288. Notably, the intermediate high resistivity layer is too far from the substrate to directly contribute to the electric field generated in the optical waveguides.

Figure 19:
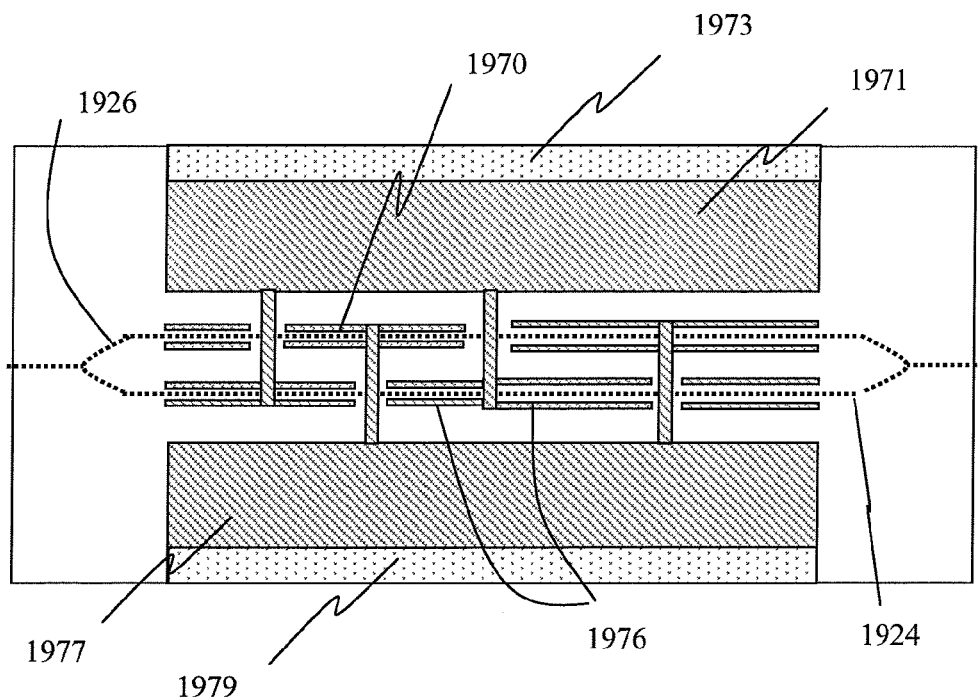
FIG. 19 is a plan view illustrating another embodiment where the bias electrode structure is segmented.

Referring to FIG. 19, there is shown another embodiment having bias electrodes that are segmented to suppress propagation of the RF signal along their length and reduce accumulated mechanical stress along their length. In this embodiment, the bias electrode material is also patterned such that each segmented bias signal electrode 1970, 1976 is coupled to an outer bias signal electrode 1977, 1971, with feed lines that extend between segments of the other bias signal electrode 1976, 1970, respectively. More specifically, feed lines couple the segmented bias signal electrodes 1970 for the first waveguide 1926 to outer bias electrode 1977, and couple the segmented bias signal electrodes 1976 for the second waveguide 1924 to outer bias electrode 1971. As a result, the outer bias electrode 1971 functions as the ground electrode for the segmented bias electrodes 1970, whereas the outer bias electrode 1977 functions as the ground electrode for the segmented bias electrodes 1976. The outer bias electrode 1971 is coupled to a low frequency or DC power source that provides a first bias voltage (e.g., −5V), whereas the other outer bias signal electrode 1977 is coupled to a low frequency or DC power source that provides a second bias voltage (e.g., +5V). Advantageously, this push-pull arrangement maximizes the modulation efficiency of the segmented bias electrodes.

In general, the outer bias signal electrodes 1971, 1977 are fabricated with a relatively low series resistance to compensate for the high series resistance introduced by the narrow segmented bias electrodes 1976, 1970, respectively. In particular, the low series resistance provides the means for the bias signal voltages to be applied to the bias signal electrodes 1970, 1976 with minimal voltage drop. In one embodiment, the series resistance is reduced by providing wide outer bias signal electrodes 1971, 1977. In another embodiment, the series resistance is reduced by providing a thin metal film 1973, 1979, such as Cr, Ni/Cr, Ti/W and/or Au, on top of each outer bias signal electrode 1971, 1977, respectively.

As discussed above, the segmented bias signal electrodes 1970, 1976 are coupled to the outer bias electrodes 1977, 1971, respectively, at multiple feed points. For illustrative purposes, 2 feed points per bias signal electrode are shown. In other embodiments, feed points are provided every 0.25 to 5 mm. The feed points may be at regular intervals or may vary over the length of the waveguides. For example, with regard to the latter, the spacing between feed points may vary incrementally (i.e., such that each successive spacing differs) or may vary step-wise (i.e., such that at least some successive spacings are the same).

Each segment of each bias signal electrode 1970, 1976 includes a split bias electrode. Advantageously, the design of bias electrodes 1970, 1976 is selected to provide a tailored frequency response. For example, in this embodiment the segments on the right hand side of FIG. 19 are longer and have a wider gap between the split bias electrodes, whereas the segments on the left-hand side of FIG. 19 are shorter and have a narrower gap between the split bias electrodes. The longer bias signal electrode segments have a larger series resistance and nearly the same capacitance, hence the RC time constant for these bias electrode segments will be much longer. The gap between the split electrodes is wider for the longer electrode segments, reducing modulation efficiency per unit length, but leaving capacitance per unit length about the same. The capacitance changes very little as a function of the gap in the split electrode whereas modulation efficiency as given by $V_\pi L$ changes dramatically. Hence, the modulation efficiency of the segments with a longer time constant can be adjusted independently of the modulation efficiency of the segments with shorter time constant. Optionally, three or more groups of bias signal electrode segments with different RC time constants and $V_\pi L$, allowing for a wide variety of tailored frequency response. In one embodiment, the bias electrode structure is designed to compensate for other effects that influence bias frequency response, creating a modulation efficiency that changes very little as frequency changes. For example, short term conductivity effects in the substrate or at the substrate surface may influence the bias electrode frequency response. The use of multiple tailored time constants in the bias electrode response may compensate for these effects, leading to a flat frequency response. A flatter bias frequency response improves performance of bias control circuits. A bias electrode with flat low frequency response is also useful for any applications where the bias or other modulation signal must be slowly swept or varied over time in a predictable manner.

Advantageously, the electro-optic devices described with regard to FIGS. 5a, 6, 7, 8, 9, 10, 11, 12, 13, 14, 15, 16, 17a,b,c, 18, and 19 are humidity tolerant. In particular, humidity tolerance is provided by burying the bias electrodes below the upper buffer layer so that they are protected from humidity, and so that electro-migration corrosion of the buried bias electrodes is reduced. Optionally, humidity tolerance is improved by eliminating the RF electrode adhesion layer, by encapsulating the RF electrode adhesion layer, and/or by using an RF electrode adhesion layer having a work function similar to the material used to form the RF electrodes. Further optionally, humidity tolerance is improved by allowing the bias electrodes to be DC isolated from the RF electrodes 540, 542, 544.

According to one embodiment, DC isolation is provided by passing the signal from an RF generator through a low pass filter onto the bias signal electrode (e.g., 570), and through a high pass filter onto the RF signal electrode (e.g., 540). Advantageously, this arrangement boosts the high end frequency response to the incoming bias signal, accommodating dither signals or other tones in the MHz frequency range, that are often summed in with the slowly varying bias voltage. According to another embodiment, a bias-tee is used to couple the bias signal electrode (e.g., 570) and the RF signal electrode (e.g., 540). Of course, various other bias control circuits are also envisioned.

In each of the above-described embodiments, the electro-optic device includes an upper buffer layer and a lower buffer layer. While the upper and lower buffer layers may be formed from the same material (e.g., doped $SiO_2$) or different materials, performance may improve when the upper and lower buffer layers have different conductivities. More specifically, performance is expected to improve when the lower buffer layer is more conductive than the upper buffer layer, and particularly when the lower buffer layer has a conductivity that is substantially the same or greater than the conductivity of the substrate. As discussed above, a relatively high conductivity may be provided with a doped $SiO_2$ buffer layer. Some examples of suitable dopants include Ti, In, Sn, Al, Cr and Zn. Doping of $SiO_2$ buffer layers to increase conductivity is well known in the art, and is discussed in further detail in U.S. Pat. Nos. 5,404,412 and 5,680,497.

Notably, an electro-optic device having a stacked design where an upper non-doped buffer layer separates the RF electrodes from the bias electrodes and a lower doped buffer layer at least partially separates the bias electrodes from the substrate, provides a number of advantages compared to an electro-optic device having a single doped buffer layer separating common bias/RF electrodes from the substrate. For example, in the former, the thickness of the doped buffer layer is selected to reduce optical loss from the bias electrodes rather than to provide velocity matching. Accordingly, the doped buffer layer is relatively thin and is likely to affect the required drive (bias) voltage. Also, in the former, the doped buffer layer is protected from the atmosphere by the non-doped buffer layer. Accordingly, impurities (e.g., water) are less likely to be absorbed therein. In addition, since the bias electrodes are protected from the atmosphere by the non-doped buffer layer, humidity tolerance is improved.

In addition, an electro-optic device having a stacked design where an upper non-doped buffer layer separates the RF electrodes from the bias electrodes and a lower doped buffer layer at least partially separates the bias electrodes from the substrate, provides a number of advantages compared to an electro-optic device having only a non-conductive buffer layer separating the RF electrodes from the bias electrodes. In particular, the lower doped buffer layer substantially reduces optical loss. For example, in the embodiments illustrated in FIGS. 13 and 14, optical loss is reduced sufficiently to enable the use of non-split bias signal electrodes with Z-cut $LiNbO_3$.

Figure 1A:
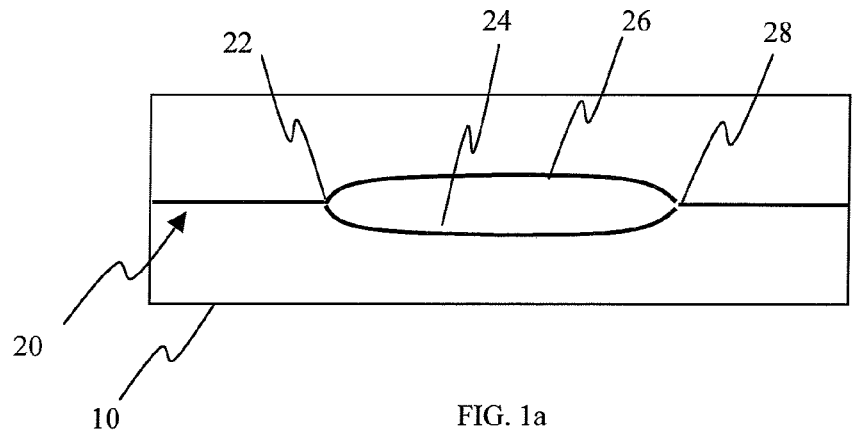
FIG. 1a is a schematic diagram of a prior art Mach-Zehnder optical modulator, illustrating a common optical waveguide configuration.
Figure 1B:
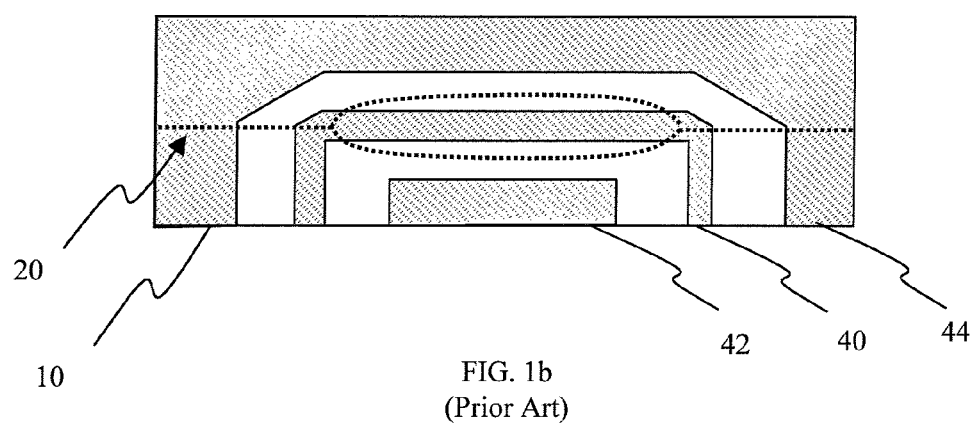
FIG. 1b is a schematic diagram of a prior art Mach-Zehnder optical modulator, illustrating a common electrode configuration for X-cut LiNbO$_3$.
Figure 1C:
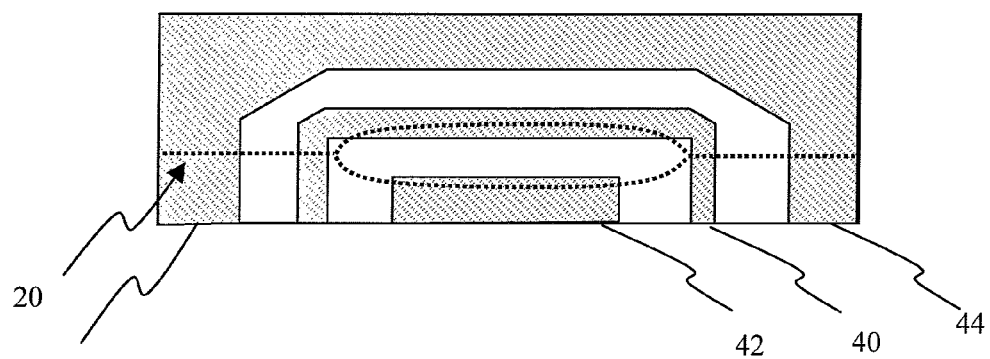
FIG. 1c is a schematic diagram of a prior art Mach-Zehnder optical modulator, illustrating a common electrode configuration for Z-cut LiNbO$_3$.
Figure 1D:
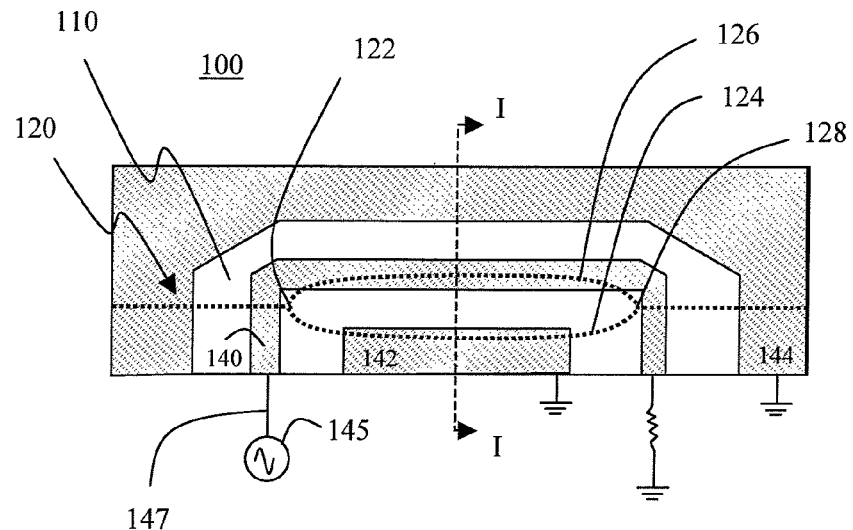
FIG. 1d is a plan view of a prior art Mach-Zehnder optical modulator having a Z-cut LiNbO$_3$ substrate.
Figure 1E:
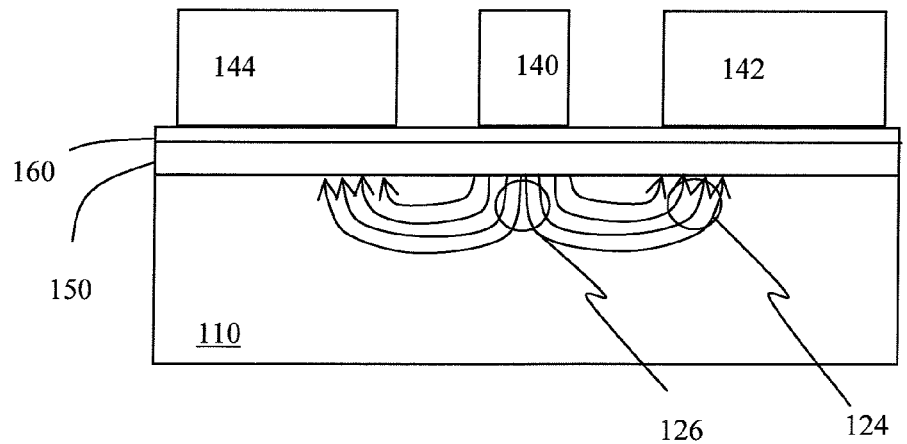
FIG. 1e is a sectional view of the prior art Mach-Zehnder optical modulator illustrated in FIG. 1d taken along line I-I.
Figure 2:
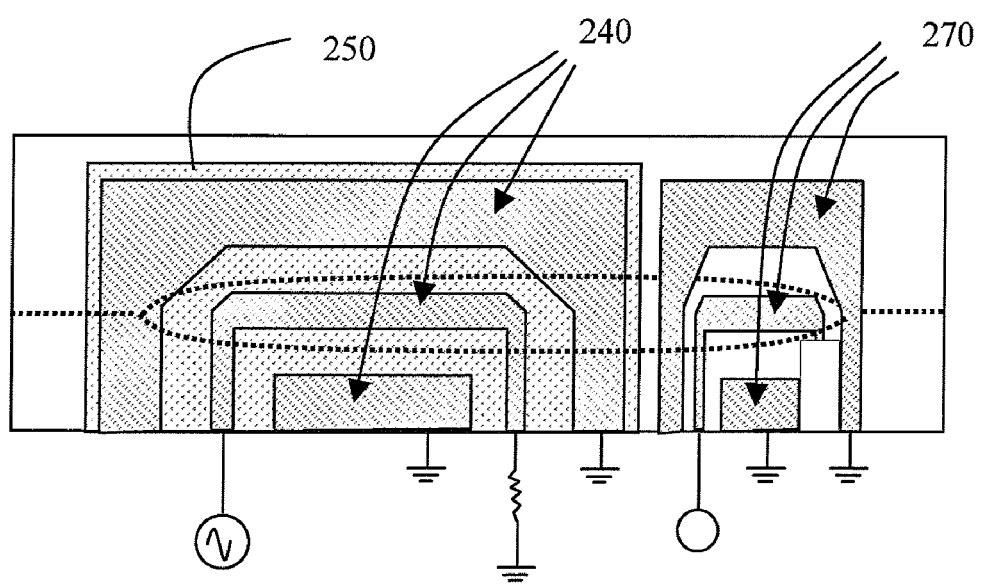
FIG. 2 is a plan view of a prior art low bias drift Mach-Zehnder optical modulator having an X-cut LiNbO$_3$ substrate.
Figure 3A:
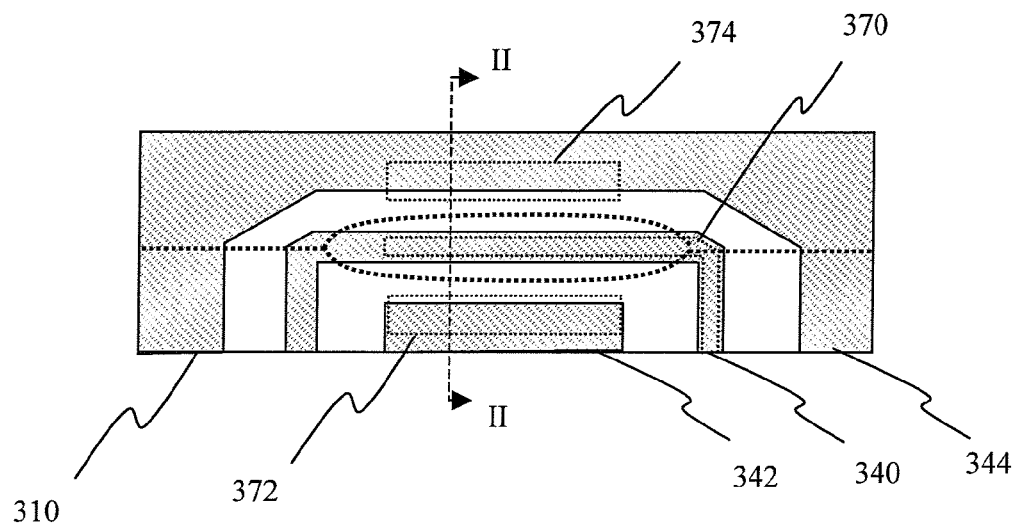
FIG. 3a is a plan view of another prior art low bias drift Mach-Zehnder optical modulator having an X-cut LiNbO$_3$ substrate.
Figure 3B:
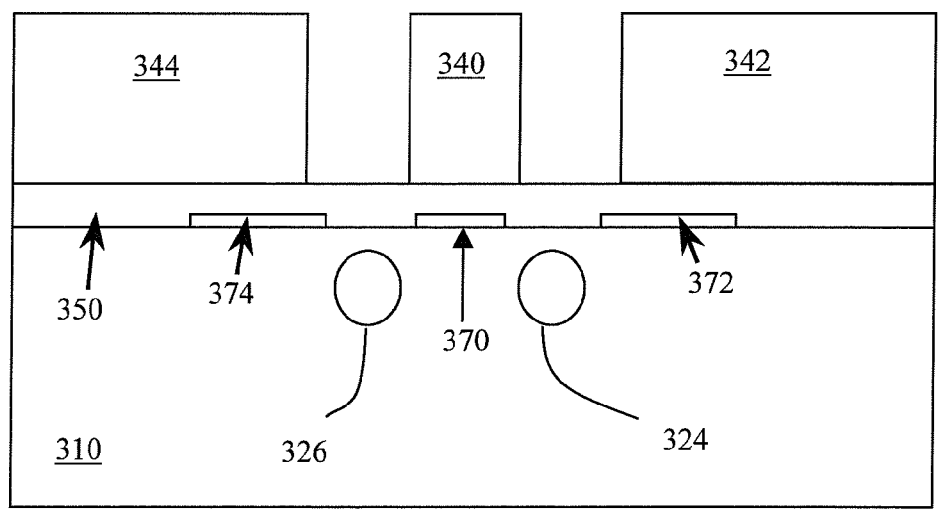
FIG. 3b is a sectional view of the prior art Mach-Zehnder optical modulator illustrated in FIG. 3a taken along line II-II.
Figure 20:
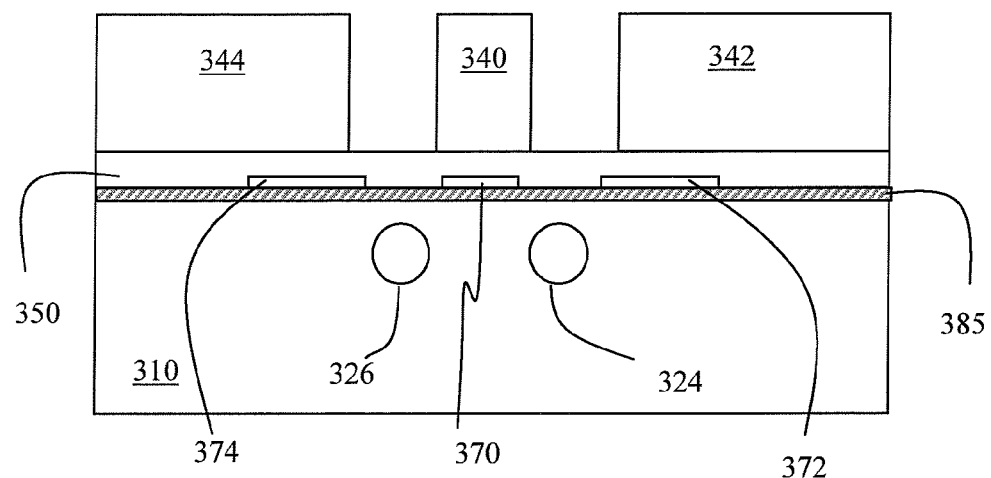
FIG. 20 is a sectional view of an electro-optic device in accordance with another embodiment of the instant invention having a planarized lower buffer layer.
Figure 21:
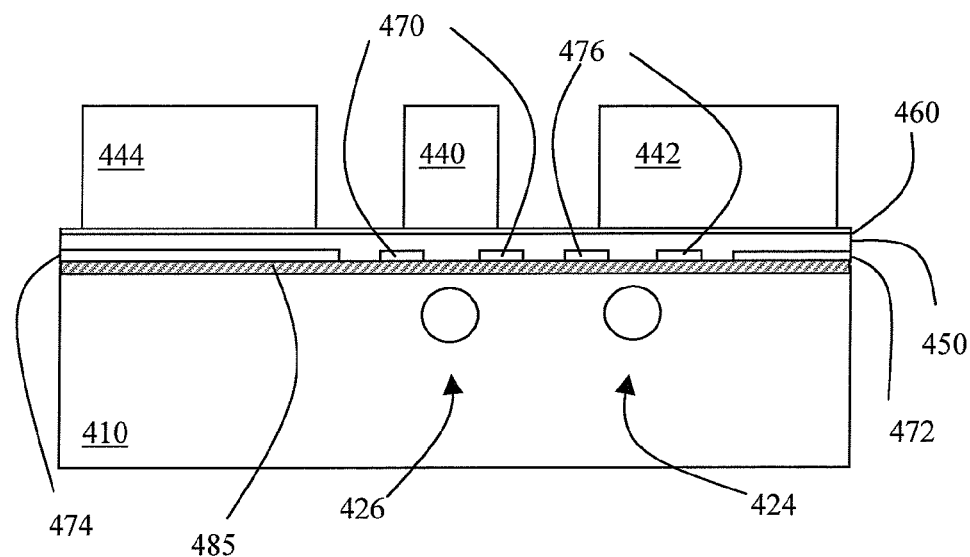
FIG. 21 is a sectional view of an electro-optic device in accordance with another embodiment of the instant invention having a planarized lower buffer layer.

While the stacked designs discussed above are particularly valuable for electro-optic devices based on Z-cut $LiNbO_3$ or Z-cut $LiTaO_3$, where the bias electrodes are generally disposed above the waveguides, they are also envisaged for use with other substrates and/or where the bias electrodes are not disposed directly above the waveguides. For example, a lower buffer layer may be included in the electro-optic devices described with regard to FIGS. 3a and 4a as illustrated in FIGS. 20 and 21, respectively. In these embodiments, the lower buffer layers 385, 485 are planarized and have a conductivity that is higher than the upper buffer layers 350, 450, respectively. In general, some examples of suitable electro-optic substrates include X-cut $LiNbO_3$, X-cut $LiTaO_3$, Y-cut $LiNbO_3$, Y-cut $LiTaO_3$, gallium arsenide (GaAs), and indium phosphide (InP). Alternatively, the substrate may be a polymer substrate having an electro-optic polymer waveguide.

Figure 22:
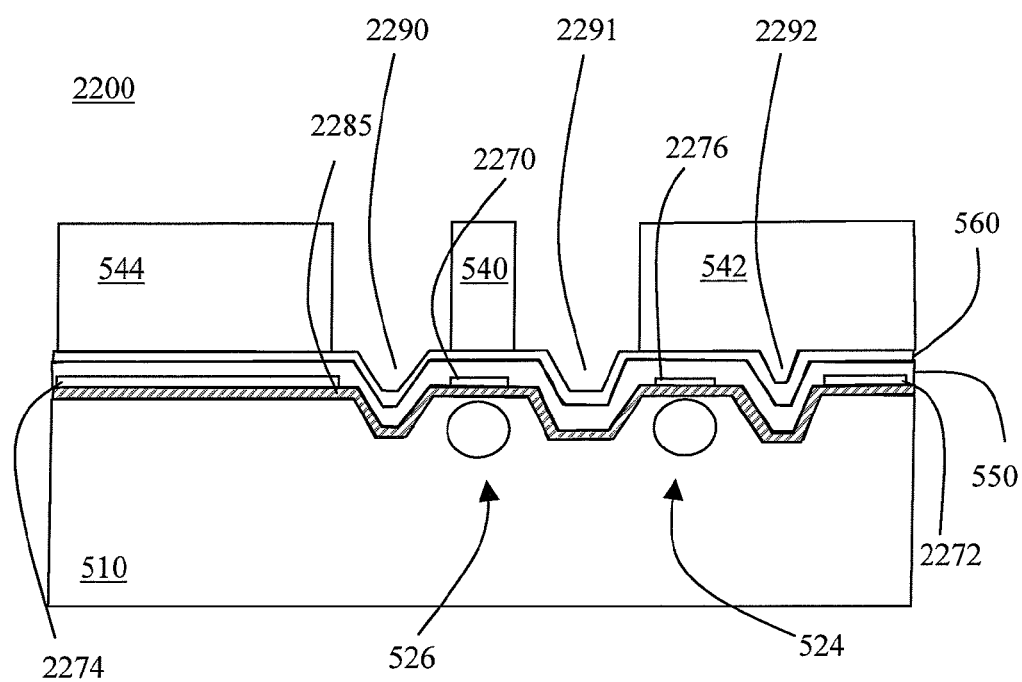
FIG. 22 is a sectional view of an electro-optic device in accordance with another embodiment of the instant invention having an etched substrate.

As shown in FIG. 22, the stacked design may also be used in electro-optic devices where the substrate has been etched to form ridges around the waveguides. The electro-optic device 2200 includes a substrate 510, etched to form slots 2290, 2291, and 2292, first 524 and second 526 optical waveguides, an RF signal electrode 540, RF ground electrodes 542, 544, an upper buffer layer 550, a bleed layer 560, first 2270 and second 2276 bias signal electrodes, bias ground electrodes 2272, 2274, and a lower buffer layer 2285.

The substrate 510, first 524 and second 526 optical waveguides, RF signal electrode 540, RF ground electrodes 542, 544, upper buffer layer 550, and bleed layer 560, are as described above.

The first bias signal electrode 2270, the second bias signal electrode 2276, the first bias ground electrode 2274, and the second bias ground electrode 2272, are all supported by the substrate 510. The bias electrodes 2270, 2272, 2274, 2276 are part of the bias electrode structure used to apply a low-frequency or DC voltage across the optical waveguides. Each of the first 2270 and second 2276 bias signal electrodes are on top of lower buffer layer 2285.

Each of the bias electrodes 2270, 2272, 2274, 2276 is typically formed from a high-resistivity material, such as tantalum silicon nitride (TaSiN), amorphous silicon (Si), indium oxide ($In_2O_3$), tin oxide ($SnO_2$), zinc oxide (ZnO), etc. Using a high resistivity material allows the bias electrodes 2270, 2272, 2274, 2276 to be conductive at low frequencies and to function as a dielectric at high-frequencies. Accordingly, the bias electrodes are effectively transparent to the electric field generated by the RF electrodes. Suitable resistivity values for the bias electrode material lie between that of the RF electrode material and that of the substrate. For example, TaSiN typically has a resistivity in the range of about $10^4$ to $10^6$ Ω-cm @25° C., which is between $\sim 2.3 \times 10^{-6}$ Ω-cm @25° C. (Au) and $\sim 1.3 \times 10^{17}$ Ω-cm @25° C. ($LiNbO_3$). Preferably, the resistivity of the bias electrode material is in the range from about 1 to $10^8$ ohm-cm (Ω-cm) @25° C., more preferably from about $10^2$ to $10^7$ ohm-cm (Ω-cm) @25° C., and most preferably from about $10^4$ to $10^6$ ohm-cm (Ω-cm) @25° C. The preferred range is determined by the fact that lower resistivity materials typically provide faster response times, whereas higher resistivity materials result in reduced optical loss due to the proximity of the bias electrode to the waveguide(s). The use of a higher resistivity bias electrode material may also reduce coupling with the RF signal, thus decreasing the net RF loss per unit length of the RF signal electrode. Each of the bias electrodes 2270, 2272, 2274, 2276 may be formed from the material used to form the bleed layer 560, or a different material. Conveniently, when bias electrodes 2270, 2272, 2274, 2276 and the bleed layer are fabricated from the same material (e.g., TaSiN), the fabrication process is relatively simple. The bias electrodes 2270, 2272, 2274, 2276 may be fabricated using one of various well-known methods, including deposition and sputtering. The thickness of the bias electrodes 2270, 2276 is typically in the range between about 0.05 and 0.5 μm, and more commonly between about 0.05 and 0.25 μm.

The lower buffer layer 2285 provides a spacer between the optical waveguides 526, 524 and the overlying bias signal electrodes 2270, 2276, respectively. Accordingly, the lower buffer layer 2285 is typically fabricated with a material that is optically transparent in the wavelength of interest (e.g., 1.55 microns). Since the bias signal electrodes 2270, 2276 are not in direct contact with the substrate 510, it is preferred that the lower buffer layer 2285 be fabricated from a material having at least some conductivity. For example, in one embodiment the lower buffer layer 2285 is fabricated with a dielectric material, such as silicon dioxide ($SiO_2$), which has been sputtered such that it exhibits a small amount of intrinsic conductivity, or that has been doped/ion-implanted such that it exhibits increased conductivity. In general, the resistivity of the lower buffer layer 2285 will be in the range from about $10^{17}$-$10^{19}$ Ω-cm @25° C. The lower buffer layer 2285 is typically fabricated using one of various well-known methods, such vacuum deposition, ion-assist vacuum deposition, sputtering, or chemical vapor deposition (CVD). The thickness of the lower buffer layer 2285 is typically in the range between about 0.05 and 1 μm, and more commonly between about 0.1 and 0.5 μm.

According to one embodiment, the electro-optic device 2200 is fabricated by first etching slots 2290, 2291, and 2292 into a Z-cut lithium niobate substrate, using a process such as Reactive Ion Etching or Ion Milling. The etch depth is typically between 1 to 10 μm. The lower buffer layer 2285 is then deposited on the etched substrate 510, conformal to the slots. The lower buffer layer is annealed, if necessary. The bias electrode material is then deposited, and etched to form bias electrodes 2270, 2272, 2274, 2276. Upper buffer layer 550, bleed layer 560, and RF electrodes 540, 542, 544 are fabricated as described above. Upper buffer layer 550 may be fabricated of the same material as the lower buffer layer 2285, or more likely of a material having higher resistivity, such as undoped silicon dioxide ($SiO_2$).

Of course, the embodiments of the invention described above have been presented by way of example only. It will be understood by those skilled in the art that various omissions and substitutions may be made without departing from the spirit and scope of the invention as defined by the appended claims.

We claim:

1. An electro-optic device comprising:
   an electro-optic substrate having an optical waveguide formed therein;
   an RF electrode structure disposed for generating an RF electric field in the optical waveguide, the RF electrode structure including a first RF electrode;
   a first buffer layer disposed between the substrate and the first RF electrode;
   a bias electrode structure disposed for generating a low frequency or DC electric field in the optical waveguide, the bias electrode structure including a first bias electrode at least partially disposed between the first buffer layer and the first RF electrode; and
   a second buffer layer disposed between the first RF electrode and the first bias electrode.

2. An electro-optic device according to claim 1, wherein a thickness of the first buffer layer is selected such a portion of the first bias electrode disposed between the first buffer layer and the first RF electrode significantly contributes to the low frequency or DC electric field generated in the optical waveguide.

3. An electro-optic device according to claim 1, wherein the first buffer layer is more conductive than the second buffer layer.

4. An electro-optic device according to claim 3, wherein the first buffer layer comprises a doped $SiO_2$ layer.

5. An electro-optic device according to claim 1, wherein the first bias electrode and the first RF electrode are substantially aligned with the optical waveguide.

6. An electro-optic device according to claim 1, wherein the first bias electrode comprises a lower portion in contact with the electro-optic substrate and an upper portion that at least partially covers the first buffer layer.

7. An electro-optic device according to claim 1, wherein the first buffer layer comprises at least one strip substantially aligned with the optical waveguide.

8. An electro-optic device according to claim 7, wherein the first bias electrode substantially encapsulates the at least one strip.

9. An electro-optic device according to claim 1, wherein the first bias electrode has one of a substantially bracket-shaped, L-shaped, E-shaped, and T-shaped cross-section.

10. An electro-optic device according to claim 1, wherein first buffer layer is planarized over the electro-optic substrate and provides a spacer between the first bias electrode and the electro-optic substrate.

11. An electro-optic device according to claim 10, wherein the first bias electrode includes two parallel strips.

12. An electro-optic device according to claim 1, wherein the first bias electrode comprises a first material having a first resistivity, the first RF electrode comprises a second material having a second resistivity, and the first resistivity is higher than the second resistivity.

13. An electro-optic device according to claim 1, wherein the electro-optic substrate comprises one of Z-cut lithium niobate and Z-cut lithium tantalate.

14. An electro-optic device according to claim 1, comprising a bleed layer disposed between the first RF electrode and the second buffer layer.

15. An electro-optic device according to claim 14, wherein the bleed layer comprises tantalum silicon nitride, and wherein the first RF electrode is deposited on the bleed layer in the absence of an adhesion layer.

16. An electro-optic device according to claim 1, wherein the first bias electrode comprises tantalum silicon nitride.

17. An electro-optic device according to claim 1, wherein the first bias electrode is DC isolated from the first RF electrode.

18. An electro-optic device according to claim 1, wherein the first bias electrode comprises a first bias signal electrode having a first plurality of elongated segments.

19. An electro-optic device according to claim 18, wherein each segment of the first plurality of elongated segments is coupled to a common bias electrode.

20. An electro-optic device according to claim 19, wherein the common bias electrode is coupled to a high conductivity strip along its length.

21. An electro-optic device according to claim 19, wherein the common bias electrode is coupled to the first plurality of elongated segments with a plurality of feed lines that extend through a second plurality of elongated segments of a second bias signal electrode.

22. An electro-optic device according to claim 19, wherein the common bias electrode is coupled to the first plurality of elongated segments with a plurality of feed lines spaced in dependence upon a predetermined frequency response of the bias electrode structure.

23. A method of fabricating an electro-optic device comprising:
providing an electro-optic substrate having an optical waveguide formed therein;
forming a first buffer layer on the electro-optic substrate;
forming a bias electrode layer on at least one of the first buffer layer and the electro-optic substrate, the bias electrode layer patterned to provide a first bias electrode that at least partially extends over the first buffer layer;
forming a second buffer layer on the bias electrode layer; and
forming an RF electrode layer on the second buffer layer, the RF electrode layer patterned to include a first RF electrode.

24. A method according to claim 23, wherein forming the first buffer layer comprises depositing a first dielectric material on the electro-optic substrate, and wherein forming the second buffer layer comprises depositing a second dielectric material on the bias electrode layer, the first dielectric material having a higher conductivity than the second dielectric material.

25. A method according to claim 23, wherein forming the first buffer layer comprises depositing a first dielectric material on the electro-optic substrate, and patterning the first dielectric material such that the first buffer layer includes at least one strip substantially aligned with the optical waveguide.

26. A method according to claim 25, wherein forming the bias electrode layer comprises depositing a high resistivity bias electrode material on at least one of the first buffer layer and the electro-optic substrate, and patterning the high resistivity bias electrode material such that the first bias electrode substantially encapsulates the at least one strip.

27. A method according to claim 25, wherein forming the bias electrode layer comprises depositing a high resistivity bias electrode material on at least one of the first buffer layer and the electro-optic substrate, and patterning the high resistivity bias electrode material such that the first bias electrode includes a lower split portion and at least one partial cap portion.

* * * * *